United States Patent
Hama et al.

(10) Patent No.: US 9,238,726 B2
(45) Date of Patent: Jan. 19, 2016

(54) MOLDED ARTICLE COMPRISING POLYPROPYLENE RESIN COMPOSITION

(71) Applicant: Sumitomo Chemical Company, Limited, Chuo-ku, Tokyo (JP)

(72) Inventors: Hisakatsu Hama, Ichihara (JP); Natsuko Sato, Osaka (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 13/746,897

(22) Filed: Jan. 22, 2013

(65) Prior Publication Data

US 2013/0189462 A1    Jul. 25, 2013

(30) Foreign Application Priority Data

Jan. 23, 2012   (JP) ................. 2012-010744

(51) Int. Cl.
| | |
|---|---|
| *C08K 5/05* | (2006.01) |
| *C08K 5/053* | (2006.01) |
| *C08K 5/134* | (2006.01) |
| *C08L 23/10* | (2006.01) |
| *C08K 5/151* | (2006.01) |
| *C08K 5/527* | (2006.01) |

(52) U.S. Cl.
CPC . *C08K 5/05* (2013.01); *C08K 5/053* (2013.01); *C08K 5/134* (2013.01); *C08K 5/151* (2013.01); *C08K 5/527* (2013.01); *Y10T 428/1352* (2015.01)

(58) Field of Classification Search
CPC .......... C08K 5/05; C08K 5/053; C08K 5/134; C08L 23/10
USPC ................... 524/56, 291, 117, 147, 129, 120; 428/35.7

See application file for complete search history.

(56) References Cited

U.S. PATENT DOCUMENTS

2012/0238674 A1*  9/2012  Atarashi et al. ................. 524/56

FOREIGN PATENT DOCUMENTS

| JP | 2010-150417 A | 7/2010 |
|---|---|---|
| JP | 2011-026558 A | 2/2011 |
| JP | 2011-236401 A | 11/2011 |
| JP | 2011-236402 A | 11/2011 |

* cited by examiner

*Primary Examiner* — James J Seidleck
*Assistant Examiner* — Deve E Valdez
(74) *Attorney, Agent, or Firm* — Panitch Schwarze Belisario & Nadel LLP

(57) ABSTRACT

Provided is an item made of a polypropylene resin composition that is suppressed from the emission of volatile organic compound components, examples of which item include a container, a cap of a container, an item for packaging, stationery, a toy, a miscellaneous daily item, an item for furniture, fiber, an agricultural film, an item for automobiles, an item for household electric appliances, an item for medical applications, or an item for building applications. The polypropylene resin composition includes a specific propylene polymer, a specific sugar compound, and a specific compound having a hydroxyphenyl group.

11 Claims, No Drawings

MOLDED ARTICLE COMPRISING POLYPROPYLENE RESIN COMPOSITION

TECHNICAL FIELD

The present invention relates to items made of a polypropylene resin composition with suppressed emission therefrom of volatile organic compound components.

BACKGROUND ART

Polypropylene resin is a representative resin that is inexpensive, light in weight, and superior in such characteristics as molding processability, mechanical characteristics, heat resistance, and long-term thermal degradation resistance particularly among thermoplastic resins. Therefore, polypropylene resin has been used for a wide range of applications, such as containers, items for food packaging, caps of containers such as bottles, stationery, miscellaneous daily items, fiber of carpets or sofas, interior and exterior materials of automobiles, items for household electric appliances, building materials such as interior materials of buildings or houses.

As an example of a resin composition that can be used for the above-mentioned applications, a polypropylene-based resin composition comprising polypropylene and hydrophobic zeolite having a specific $SiO_2/Al_2O_3$ molar ratio is disclosed in patent document 1. Patent document 2 discloses a polypropylene-based resin composition comprising polypropylene and alumina. Patent documents 3 and 4 each disclose a thermoplastic polymer composition comprising a thermoplastic polymer, a specific organophosphorus compound, and a specific sugar compound.

PRIOR ART DOCUMENTS

Patent Document

[Patent Document 1] JP-A-2010-150417
[Patent Document 2] JP-A-2011-26558
[Patent Document 3] JP-A-2011-236401
[Patent Document 4] JP-A-2011-236402

SUMMARY OF THE INVENTION

Problems to be Solved by the Invention

However, molded articles of the compositions disclosed in patent documents 1 to 4 cited above have been demanded for further suppression of emission of volatile organic compound components. The objective of the present invention is to provide an item comprising a polypropylene resin composition with suppressed emission therefrom of volatile organic compound components.

As a result of earnest investigations, the present inventors found that the present invention could solve the problem and have accomplished the present invention.

That is, the present invention relates to an item comprising a polypropylene resin composition comprising component (A), component (B), and component (C) each defined below:
component (A): a propylene homopolymer or
a propylene polymerized material obtained by multistage polymerization comprising 50 to 99% by weight of a propylene polymer (I) and 1 to 50% by weight of a copolymer (II) of propylene and an olefin other than propylene,
wherein the content of the propylene polymer (I) constituting the propylene polymerized material obtained by the multistage polymerization is 50 to 99% by weight, and the content of the copolymer (II) of propylene and the olefin other than propylene is 1 to 50% by weight, provided that the total weight of the polymer (I) and the copolymer (II) is taken as 100% by weight; the polymer (I) comprises structural units derived from propylene, wherein the content of the structural units is more than 75% by weight but not more than 100% by weight, provided that the overall weight of the polymer (I) is taken as 100% by weight, and
the copolymer (II) comprises structural units derived from propylene and structural units derived from the olefin other than propylene, wherein the content of the structural units derived from the olefin other than propylene is 25% by weight to 80% by weight, provided that the overall weight of the copolymer (II) is taken as 100% by weight,
component (B): at least one compound selected from the following compound group S,
compound group S: a group consisting of compounds represented by a formula: $C_nH_{n+2}(OH)n$ wherein n represents an integer of 4 or more, alkoxy forms defined below, compounds represented by the following formula (2), trehalose, sucrose, lactose, maltose, melicitose, stachyose, curdlan, glycogen, glucose, and fructose;
alkoxy form: a compound having a structure in which the hydrogen atom of at least one hydroxyl group out of the hydroxyl groups contained in a compound represented by the following formula (1) has been replaced by an alkyl group having 1 to 12 carbon atoms, wherein the compound represented by formula (1) has one formyl group, ether group, or keto group and m−1 hydroxyl group(s):

$$C_mH_{2m}O_m \quad (1)$$

wherein m is an integer of 3 or more,

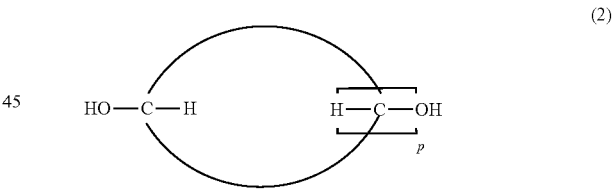

wherein p is an integer of 2 or more,
component (C): a compound represented by the following formula (3) and/or a compound represented by the following formula (4):

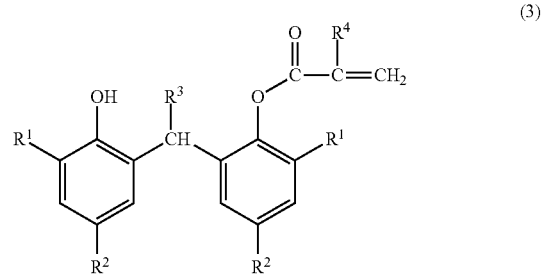

wherein $R^1$ and $R^2$ each independently at each occurrence represent an alkyl group having 1 to 8 carbon atoms, an aryl group having 6 to 12 carbon atoms, or an aralkyl group having 7 to 18 carbon atoms, $R^3$ represents a hydrogen atom or an alkyl group having 1 to 3 carbon atoms, and $R^4$ represents a hydrogen atom or a methyl group,

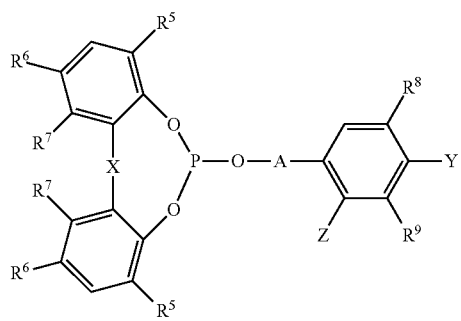

(4)

wherein $R^5$, $R^6$, $R^8$, and $R^9$ each independently at each occurrence represent a hydrogen atom, an alkyl group having from 1 to 8 carbon atoms, a cycloalkyl group having 5 to 8 carbon atoms, an alkylcycloalkyl group having 6 to 12 carbon atoms, an aralkyl group having 7 to 12 carbon atoms, or a phenyl group, $R^7$ each independently represents a hydrogen atom or an alkyl group having 1 to 8 carbon atoms, X represents a sulfur atom or a divalent group represented by the following formula (I-1):

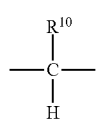

(I-1)

wherein $R^{10}$ represents a hydrogen atom, an alkyl group having 1 to 8 carbon atoms, or a cycloalkyl group having 5 to 8 carbon atoms, A is an alkylene group having 2 to 8 carbon atoms or a divalent group represented by the following formula (I-2):

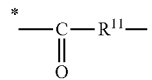

(I-2)

wherein $R^{11}$ represents a single bond or an alkylene group having 1 to 8 carbon atoms, and * represents a site which bonds to an oxygen atom; one out of Y and Z represents a hydroxy group, an alkyl group having 1 to 8 carbon atoms, an alkoxy group having 1 to 8 carbon atoms, or an aralkyloxy group having 7 to 12 carbon atoms, and the other represents a hydrogen atom or an alkyl group having 1 to 8 carbon atoms.

In one preferred embodiment, the polypropylene resin composition comprising components (A), (B), and (C) further comprises the following component (D), component (D): a compound represented by the following formula (5):

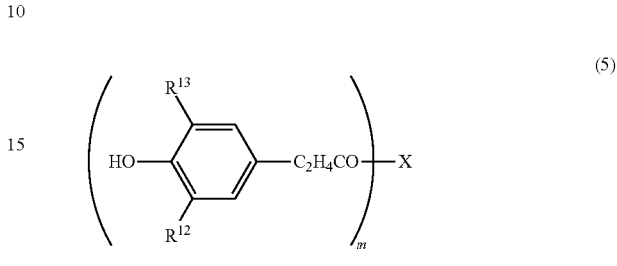

(5)

wherein $R^{12}$ and $R^{13}$ each independently at each occurrence a hydrogen atom or an alkyl group having 1 to 6 carbon atoms, X represents an m-valent alcohol residue having 1 to 24 carbon atoms that may contain a hetero atom and/or a cyclic group, and m represents an integer of 1 to 4, wherein the alcohol residue is a residual group formed by removing a hydrogen atom from a hydroxyl group of an alcohol.

In another preferred embodiment, the polypropylene resin composition further comprises the following component (E), component (E): an organophosphorus compound represented by the following formula (6), an organophosphorus compound represented by the following formula (7), an organophosphorus compound represented by the following formula, (8), an organophosphorus compound represented by the following formula (9), or an organophosphorus compound represented by the following formula (10):

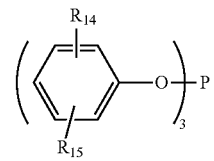

(6)

wherein $R^{14}$ and $R^{15}$ each independently at each occurrence represent a hydrogen atom, an alkyl group having from 1 to 9 carbon atoms, a cycloalkyl group having 5 to 8 carbon atoms, an alkylcycloalkyl group having 6 to 12 carbon atoms, an aralkyl group having 7 to 12 carbon atoms, or a phenyl group;

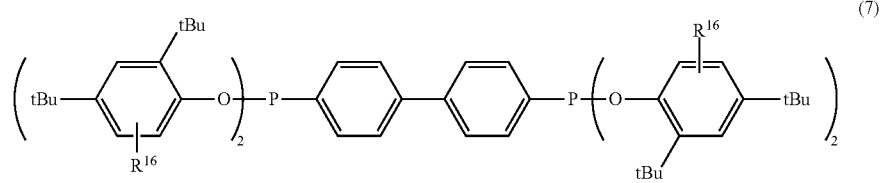

(7)

wherein $R^{16}$ represents a hydrogen atom, an alkyl group having from 1 to 9 carbon atoms, a cycloalkyl group having 5 to 8 carbon atoms, an alkylcycloalkyl group having 6 to 12 carbon atoms, an aralkyl group having 7 to 12 carbon atoms, or a phenyl group;

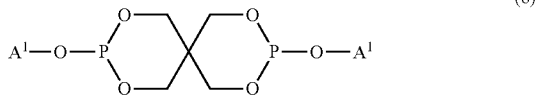

(8)

wherein $A^1$ represents an alkyl group having 1 to 18 carbon atoms, a phenyl group optionally substituted with an alkyl group having 1 to 9 carbon atoms, a phenyl group optionally substituted with a cycloalkyl group having 5 to 8 carbon atoms, a phenyl group optionally substituted with an alkylcycloalkyl group having 6 to 12 carbon atoms, or a phenyl group optionally substituted with an aralkyl group having 7 to 12 carbon atoms;

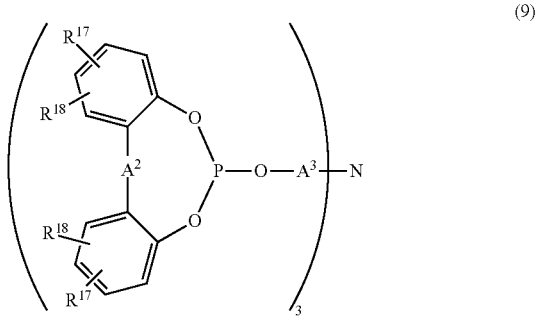

(9)

wherein $R^{17}$ and $R^{18}$ each independently at each occurrence represent a hydrogen group, an alkyl group having 1 to 9 carbon atoms, a cycloalkyl group having 5 to 8 carbon atoms, an alkylcycloalkyl group having 6 to 12 carbon atoms, an aralkyl group having 7 to 12 carbon atoms, or a phenyl group, $A^2$ represents a single bond, a sulfur atom, or an alkylidene group having 1 to 8 carbon atoms, and $A^3$ represents an alkylene group having 2 to 8 carbon atoms;

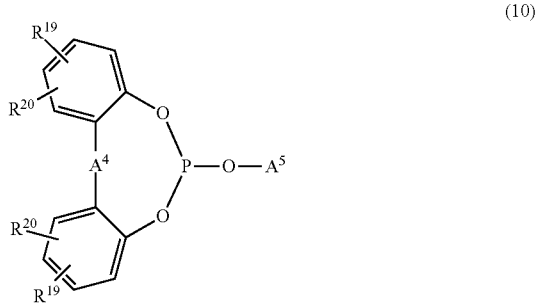

(10)

wherein $R^{19}$ and $R^{20}$ each independently at each occurrence represent a hydrogen group, an alkyl group having 1 to 9 carbon atoms, a cycloalkyl group having 5 to 8 carbon atoms, an alkylcycloalkyl group having 6 to 12 carbon atoms, an aralkyl group having 7 to 12 carbon atoms, or a phenyl group, $A^4$ represents a single bond, a sulfur atom, or an alkylidene group having 1 to 8 carbon atoms, and $A^5$ represents an alkyl group having 1 to 8 carbon atoms, a phenyl group optionally substituted with an alkyl group having 1 to 9 carbon atoms, a phenyl group optionally substituted with a cycloalkyl group having 5 to 8 carbon atoms, a phenyl group optionally substituted with an alkylcycloalkyl group having 6 to 12 carbon atoms, or a phenyl group optionally substituted with an aralkyl group having 7 to 12 carbon atoms.

In still another preferred embodiment, the polypropylene resin composition comprising components (A), (B), and (C) further comprises the following component (F), component (F): at least one filler selected from the group consisting of calcium hydroxide, alumina, zeolite, and hydrotalcite.

In still another preferred embodiment, the item is a container, a cap of a container, an item for packaging, stationery, a toy, a miscellaneous daily item, an item for furniture, fiber, an agricultural film, an item for automobiles, an item for household electric appliances, an item for medical applications, or an item for building applications.

Advantageous Effects of the Invention

According to the present invention, there can be obtained an item comprising a polypropylene resin composition with suppressed emission therefrom of volatile organic compound components.

MODE FOR CARRYING OUT THE INVENTION

The polypropylene resin composition to be used for the present invention comprises component (A), component (B), and component (C) described below.

[Component (A)]

Component (A): a propylene homopolymer or a propylene polymerized material obtained by multistage polymerization comprising 50 to 99% by weight of a propylene polymer (I) and 1 to 50% by weight of a copolymer (II) of propylene and an olefin other than propylene, wherein the content of the propylene polymer (I) constituting the propylene polymerized material obtained by the multistage polymerization is 50 to 99% by weight, and the content of the copolymer (II) of propylene and the olefin other than propylene is 1 to 50% by weight, provided that the total weight of the polymer (I) and the copolymer (II) is taken as 100% by weight. Regarding the contents of the polymer (I) and the copolymer (II), the content of the polymer (I) is preferably 60 to 95% by weight and the content of the copolymer (II) is preferably 5 to 40% by weight. More preferably, the content of the polymer (I) is 65 to 90% by weight and the content of the copolymer (II) is preferably 10 to 35% by weight. Even more preferably, the content of the polymer (I) is 70 to 85% by weight and the content of the copolymer (II) is preferably 15 to 30% by weight. By the adjustment of the content of the polymer (I) to 50 to 99% by weight (in other words, by the adjustment of the content of the copolymer (II) to 1 to 50% by weight), the appearance and the anti-fogging property of an item can be improved. The polymer (I) comprises structural units derived from propylene, wherein the content of the structural units is more than 75% by weight but not more than 100% by weight, provided that the overall weight of the polymer (I) is taken as 100% by weight.

The copolymer (II) comprises structural units derived from propylene and structural units derived from the olefin other than propylene, wherein the content of the structural units derived from the olefin other than propylene is not less than 25% by weight and not more than 80% by weight, provided that the overall weight of the copolymer (II) is taken as 100% by weight.

Polymer (I) is a propylene homopolymer or a propylene copolymer; when the polymer (I) is a propylene copolymer, it is a propylene copolymer that is composed of structural units derived from at least one comonomer selected from the group consisting of ethylene and α-olefins having 4 to 10 carbon atoms and structural units derived from propylene.

The polymer (I) comprises structural units derived from propylene, wherein the content of the structural units is more than 75% by weight but not more than 100% by weight, provided that the overall weight of the polymer (I) is taken as 100% by weight. The content of the structural units derived from propylene contained in polymer (I) is preferably 80% by weight to 100% by weight, more preferably 90% by weight to 100% by weight.

The content of the structural units derived from at least one comonomer selected from the group consisting of ethylene and α-olefins having 4 to 10 carbon atoms is less than 25% by weight, provided that the overall amount of polymer (I) is taken as 100% by weight.

1-Butene, 1-hexene, and 1-octene are preferred as the α-olefin having 4 to 10 carbon atoms, and 1-butene is more preferred.

Examples of the polymer (I) include propylene homopolymers, propylene-ethylene copolymers, propylene-1-butene copolymers, propylene-ethylene-1-butene copolymers, propylene-1-hexene copolymers, propylene-1-octene copolymers, propylene-ethylene-1-butene copolymers, propylene-ethylene-1-hexene copolymers, and propylene-ethylene-1-octene copolymers, preferred are propylene homopolymers, propylene-ethylene copolymers, propylene-1-butene copolymers, propylene-ethylene-1-butene copolymers, and more preferred are propylene homopolymers.

The structural units derived from the olefin other than propylene contained in the copolymer (II) is ones derived from at least one olefin selected from the group consisting of ethylene and α-olefins having 4 or more carbon atoms; the copolymer (II) comprises structural units derived from propylene and structural units derived from the olefin other than propylene, wherein the content of the structural units derived from the olefin other than propylene is not less than 25% by weight and not more than 80% by weight, preferably 30 to 70% by weight, more preferably 40 to 65% by weight, and even more preferably 50 to 65% by weight, provided that the overall weight of the copolymer (II) is taken as 100% by weight. By the adjustment of the content of structural units derived from the olefin other than propylene contained in the copolymer (II) to not less than 25% by weight and not more than 80% by weight, the flowability of the polypropylene resin composition and the appearance of an item can be improved.

Examples of the copolymer (II) include propylene-ethylene copolymers, propylene-ethylene-1-butene copolymers, propylene-ethylene-1-hexene copolymers, propylene-ethylene-1-octene copolymers, propylene-ethylene-1-decene copolymers, propylene-1-butene copolymers, propylene-1-hexene copolymers, propylene-1-octene copolymers, and propylene-1-decene copolymers, preferred are propylene-ethylene copolymers, propylene-1-butene copolymers, and propylene-ethylene-1-butene copolymers, and more preferred are propylene-ethylene copolymers.

Examples of the propylene polymerized material obtained by multistage polymerization when the polymer (I) is a propylene homopolymer include
a propylene polymerized material composed of a propylene homopolymer and a propylene-ethylene copolymer,
a propylene polymerized material composed of a propylene homopolymer and a propylene-ethylene-1-butene copolymer,
a propylene polymerized material composed of a propylene homopolymer and a propylene-ethylene-1-hexene copolymer,
a propylene polymerized material composed of a propylene homopolymer and a propylene-ethylene-1-octene copolymer,
a propylene polymerized material composed of a propylene homopolymer and a propylene-1-butene copolymer,
a propylene polymerized material composed of a propylene homopolymer and a propylene-1-hexene copolymer,
a propylene polymerized material composed of a propylene homopolymer and a propylene-1-octene copolymer, and
a propylene polymerized material composed of a propylene homopolymer and a propylene-1-decene copolymer.

Examples of the propylene polymerized material obtained by multistage polymerization when the polymer (I) is a propylene-ethylene copolymer include
a propylene polymerized material composed of a propylene-ethylene copolymer and a propylene-ethylene copolymer,
a propylene polymerized material composed of a propylene-ethylene copolymer and a propylene-ethylene-1-butene copolymer,
a propylene polymerized material composed of a propylene-ethylene copolymer and a propylene-ethylene-1-hexene copolymer,
a propylene polymerized material composed of a propylene-ethylene copolymer and a propylene-ethylene-1-octene copolymer,
a propylene polymerized material composed of a propylene-ethylene copolymer and a propylene-ethylene-1-decene copolymer,
a propylene polymerized material composed of propylene-ethylene copolymer and a propylene-1-butene copolymer,
a propylene polymerized material composed of a propylene-ethylene copolymer and a propylene-1-hexene copolymer,
a propylene polymerized material composed of a propylene-ethylene copolymer and a propylene-1-octene copolymer,
a propylene polymerized material composed of a propylene-ethylene copolymer and a propylene-1-decene copolymer,
a block copolymer of a propylene-1-butene copolymer and a propylene-ethylene copolymer,
a propylene polymerized material composed of a propylene-1-butene copolymer and a propylene-ethylene-1-butene copolymer,
a propylene polymerized material composed of a propylene-1-butene copolymer and a propylene-ethylene-1-hexene copolymer,
a propylene polymerized material composed of a propylene-1-butene copolymer and a propylene-ethylene-1-octene copolymer,
a propylene polymerized material composed of a propylene-1-butene copolymer and a propylene-ethylene-1-decene copolymer,
a propylene polymerized material composed of a propylene-1-butene copolymer and a propylene-1-butene copolymer,
a propylene polymerized material composed of a propylene-1-butene copolymer and a propylene-1-hexene copolymer,
a propylene polymerized material composed of a propylene-1-butene copolymer and a propylene-1-octene copolymer,
a propylene polymerized material composed of a propylene-1-butene copolymer and a propylene-1-decene copolymer,
a propylene polymerized material composed of a propylene-1-hexene copolymer and a propylene-1-hexene copolymer,
a propylene polymerized material composed of a propylene-1-hexene copolymer and a propylene-1-octene copolymer,
a propylene polymerized material composed of a propylene-1-hexene copolymer and a propylene-1-decene copolymer, a propylene polymerized material composed of a propylene-1-octene copolymer and a propylene-1-octene copolymer, and
a propylene polymerized material composed of propylene-1-octene copolymer and a propylene-1-decene copolymer.

Preferred as the propylene polymerized material obtained by multistage polymerization are
a propylene polymerized material composed of a propylene homopolymer and a propylene-ethylene copolymer,
a propylene polymerized material composed of a propylene homopolymer and a propylene-ethylene-1-butene copolymer,
a propylene polymerized material composed of a propylene-ethylene copolymer and a propylene-ethylene copolymer,
a propylene polymerized material composed of a propylene-ethylene copolymer and an ethylene-1-butene copolymer, and
a propylene polymerized material composed of a propylene-1-butene copolymer and a propylene-1-butene copolymer, and more preferred is a propylene polymerized material composed of a propylene homopolymer and a propylene-ethylene copolymer.

Regarding the method of producing component (A), it is produced by a conventional polymerization method using a conventional polymerization catalyst. Examples of the conventional polymerization catalyst include polymerization catalysts including Ziegler type catalyst systems, Ziegler-Natta type catalyst systems, catalyst systems composed of an alkyl aluminoxane and a compound of a transition metal of Group 4 of the periodic table which compound has a cyclopentadienyl ring, catalyst systems composed of an organoaluminum compound, a compound of a transition metal of Group 4 of the periodic table which compound has a cyclopentadienyl ring, and a compound capable of reacting with the compound of the transition metal to form an ionic complex; preliminarily polymerized catalysts prepared by preliminarily polymerizing ethylene, an α-olefin, and so on in the presence of the above-described catalyst systems may also be used. Examples of these catalyst systems include the catalyst systems disclosed in JP-A-61-218606, JP-A-61-287904, JP-A-5-194685, JP-A-7-216017, JP-A-9-316147, JP-A-10-212319, and JP-A-2004-182981.

Examples of the conventional polymerization method include bulk polymerization, solution polymerization, slurry polymerization, and gas phase polymerization. Bulk polymerization is a method by which polymerization is carried out using, as a medium, an olefin which is liquid at the polymerization temperature. The solution polymerization and the slurry polymerization are methods which are performed in an inert hydrocarbon solvent such as propane, butane, isobutane, pentane, hexane, heptane and octane. The gas phase polymerization is a method in which a gaseous monomer is used as a medium and a gaseous monomer is polymerized in the medium. Such polymerization methods may be conducted either in a batch system or in a continuous system and may be combined appropriately. From the industrial and economical point of view, a production method by a continuous vapor phase polymerization method or by a bulk-vapor phase polymerization method in which a bulk polymerization method and a vapor phase polymerization method are used continuously is preferred.

The method for producing a propylene polymerized material obtained by multistage polymerization is a method of producing the material in multiple stages including two or more stages. Examples of such a multistage production method include the production methods by multistage polymerization disclosed in JP-A-5-194685 and JP-A-2002-12719. The conditions of a polymerization step (e.g., polymerization temperature, polymerization pressure, monomer concentration, amount of catalyst, and polymerization time) may be varied and determined appropriately according to the desired propylene polymerized material. If necessary, in order to remove the remaining solvent of a propylene polymerized material or ultralow molecular weight oligomers by-produced during production, drying may be carried out at a temperature not higher than the temperature at which the propylene polymerized material melts. Examples of a drying method include the methods disclosed in JP-A-55-75410 and the publication of Japanese Patent No. 2565753.

[Component (B)]

Component (B) is at least one compound selected from the following compound group S, compound group S: a group consisting of compounds represented by a formula: $C_nH_{n+2}(OH)_n$ wherein n represents an integer of 4 or more, alkoxy forms defined below, compounds represented by the following formula (2), trehalose, sucrose, lactose, maltose, melicitose, stachyose, curdlan, glycogen, glucose, and fructose;

alkoxy form: a compound having a structure in which the hydrogen atom of at least one hydroxyl group out of the hydroxyl groups contained in a compound represented by the following formula (1) has been replaced by an alkyl group having 1 to 12 carbon atoms, wherein the compound represented by formula (1) has one formyl group, keto group, or ether group and m−1 hydroxyl group (s):

$$C_mH_{2m}O_m \hfill (1)$$

wherein m is an integer of 3 or more,

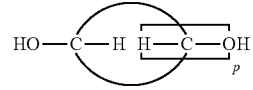

(2)

wherein p is an integer of 2 or more.

n in the formula of the compound represented by the formula $C_nH_{n+2}(OH)_n$ (this may be hereinafter indicated as "compound (S1)") represents an integer of 4 or more. n is preferably an integer of 5 to 8, more preferably 6.

Examples of compound S1 include sugar alcohols having 4 or more carbon atoms. Examples of sugar alcohols of n=4 include erythritol and threitol; examples of sugar alcohols of n=5 include adonitol, arabinitol, and xylitol; examples of sugar alcohols of n=6 include allitol, talitol, sorbitol, mannitol, iditol, and galactitol; examples of sugar alcohols of n=7 include volemitol and perseitol; and examples of sugar alcohols of n=8 include octitol.

Compound S1 may be either a D-form or an L-form or alternatively may be a mixture of D- and L-forms. Moreover, it may also be either optically active or optically inactive.

Preferably, compound S1 is a sugar alcohol having six carbon atoms.

Alkoxy forms are compounds having a structure in which the hydrogen atom of at least one hydroxyl group out of the hydroxyl groups contained in a compound represented by the following formula (1) (this compound may hereinafter be referred to as "compound (S2)") has been replaced by an alkyl group having 1 to 12 carbon atoms, wherein the compound (S2) has one formyl group, keto group, or ether group and m−1 hydroxyl group(s):

$$C_mH_{2m}O_m \hfill (1)$$

wherein m is an integer of 3 or greater and the compound of formula (1) has one aldehyde group or ketone group and m−1 hydroxyl groups;

m of compound (S2) is an integer of 3 or greater, preferably 3 to 60, and more preferably 6 or 12.

Compound (S2) has one formyl group or one carbonyl group. Moreover, compound (S2) has m−1 hydroxy groups.

Compound (S2) is preferably a monosaccharide, specific examples thereof include monosaccharides having an aldehyde group, such as glycerose, erythrose, threose, ribose, lixose, xylose, arabinose, aldohexose, allose, talose, gulose, glucose, altrose, mannose, galactose, idose, and octose, and monosaccharides having a ketone group, such as ketotriose, dihydroxyacetone, ketotetrose, erythrulose, ketopentose, xylulose, ribulose, ketohexose, psicose, fructose, sorbose, and tagatose.

Compound (S2) may be an optically active isomer such as a D-form and an L-form or alternatively may be an optically inactive such as a DL form.

In particular, hexoses, such as allose, talose, gulose, glucose, altrose, mannose, galactose, idose, psicose, fructose, sorbose, and tagatose, are preferred as compound (S2), and glucose is particularly preferred.

Alkoxy forms are compounds having a structure in which the hydrogen atom of at least one hydroxyl group out of the hydroxyl groups contained in compound (S2) has been replaced by an alkyl group having 1 to 12 carbon atoms. Such an alkoxy form preferably has at least one hydroxy group. Particularly preferred is an alkoxy form in which the hydrogen atom of at least one hydroxyl group out of the hydroxyl groups contained in compound (S2) has been replaced by an alkyl group having 1 to 12 carbon atoms with the other hydroxy groups remaining unreplaced. The number of the carbon atom(s) of the alkyl group is from 1 to 12, preferably 1 or 2, and more preferably 1.

Examples of preferred alkoxy forms include compounds represented by formula (2-1), wherein $R^{41}$ represents an alkyl group having 1 to 12 carbon atoms, preferably 5 to 12 carbon atoms.

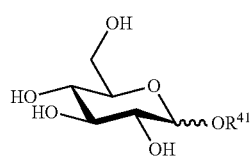

(2-1)

Examples of the compounds represented by formula (2-1) include methyl α-D-glucopyranoside, methyl β-D-glucopyranoside, ethyl α-D-glucopyranoside, ethyl β-D-glucopyranoside, n-propyl α-D-glucopyranoside, n-propyl β-D-glucopyranoside, n-butyl α-D-glucopyranoside, n-butyl β-D-glucopyranoside, n-pentyl α-D-glucopyranoside, n-pentyl β-D-glucopyranoside, n-hexyl α-D-glucopyranoside, n-hexyl β-D-glucopyranoside, n-heptyl α-D-glucopyranoside, n-heptyl β-D-glucopyranoside, n-octyl α-D-glucopyranoside, n-octyl. β-D-glucopyranoside, n-nonyl α-D-glucopyranoside, n-nonyl β-D-glucopyranoside, n-decyl α-D-glucopyranoside, n-decyl β-D-glucopyranoside, n-undecyl α-D-glucopyranoside, n-undecyl β-D-glucopyranoside, n-dodecyl α-D-glucopyranoside, and n-dodecyl β-D-glucopyranoside.

Examples of the method for producing an alkoxy form include a method involving passing hydrogen chloride gas through an alcohol solution of compound (S2) at a temperature of from −10° C. to room temperature in accordance with the disclosure of "Shin Jikken Kagaku Koza (New Lectures of Experimental Chemistry), Vol. 14, Synthesis and Reaction of Organic Compounds V", p. 2426 (1978, Maruzen Co., Ltd.), specifically, a method that involves producing an alkoxy form by refluxing a mixed solution of compound (S2), alkyl alcohol, and hydrochloric acid by heating. Methyl α-D-glucopyranoside, n-octyl β-D-glucopyranoside, etc. are available from Tokyo Chemical Industry Co., Ltd.

As to a compound represented by the following formula (2), which may hereinafter be referred to as "compound (S3)", p in formula (2) represents an integer of 2 or greater and is preferably 2 to 6, and more preferably represents 5,

(2)

wherein p is an integer of 2 or more.

Examples of compound (S3) include 1,2,3-trihydroxycyclopropane, 1,2,3,4-tetrahydroxycyclopentane, 1,2,3,4,5-pentahydroxycyclopentane, 1,2,3,4,5,6-hexahydroxycyclohexane, 1,2,3,4,5,6,7-heptahydroxycycloheptane, and 1,2,3,4,5,6,7,8-octahydroxycyclooctane.

1,2,3,4,5,6-Hexahydroxycyclohexanes, such as myo-inositol, epi-inositol, allo-inositol, muco-inositol, neo-inositol, chiro-inositol, and scyllo-inositol, are preferred, and particularly, myo-inositol and scyllo-inositol, which are represented by the following formula, are preferred.

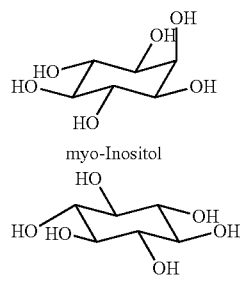

myo-Inositol scyllo-Inositol

The content of component (B) is preferably 0.001 to 0.5 parts by weight, more preferably 0.005 to 0.25 parts by weight per 100 parts by weight of component (A).

When the content of component (B) is adjusted to 0.005 to 0.25 parts by weight per 100 parts by weight of component (A), there can be obtained an item comprising a polypropylene resin composition with suppressed emission therefrom of volatile organic compound components.

[Component (C)]

Component (C) is a compound represented by the following formula (3) and/or a compound represented by the following formula (4):

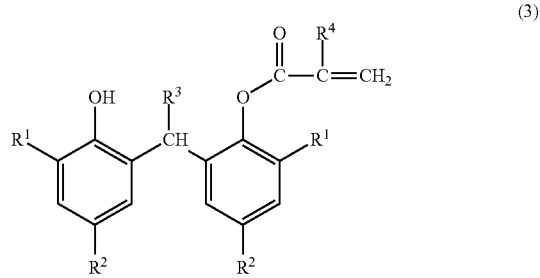

(3)

wherein $R^1$ and $R^2$ each independently at each occurrence represent an alkyl group having 1 to 8 carbon atoms, an aryl group having 6 to 12 carbon atoms, or an aralkyl group having 7 to 18 carbon atoms, $R^3$ represents a hydrogen atom or an alkyl group having 1 to 3 carbon atoms, and $R^4$ represents a hydrogen atom or a methyl group,

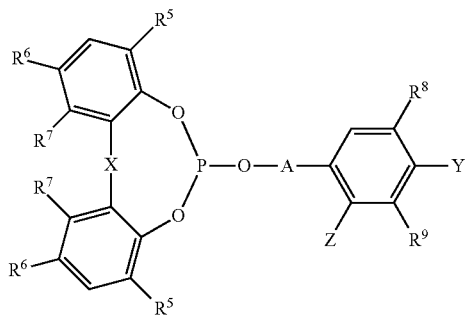

(4)

wherein $R^5$, $R^6$, $R^8$, and $R^9$ each independently at each occurrence represent a hydrogen atom, an alkyl group having from 1 to 8 carbon atoms, a cycloalkyl group having 5 to 8 carbon atoms, an alkylcycloalkyl group having 6 to 12 carbon atoms, an aralkyl group having 7 to 12 carbon atoms, or a phenyl group, $R^7$ each independently represents a hydrogen atom or an alkyl group having 1 to 8 carbon atoms, X represents a sulfur atom or a divalent group represented by the following formula (I-1):

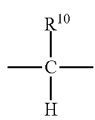

(I-1)

wherein $R^{10}$ represents a hydrogen atom, an alkyl group having 1 to 8 carbon atoms, or a cycloalkyl group having 5 to 8 carbon atoms, A is an alkylene group having 2 to 8 carbon atoms or a divalent group represented by the following formula (I-2):

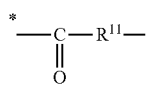

(I-2)

wherein $R^{11}$ represents a single bond or an alkylene group having 1 to 8 carbon atoms, and * represents a site which bonds to an oxygen atom; one out of Y and Z represents a hydroxy group, an alkyl group having 1 to 8 carbon atoms, an alkoxy group having 1 to 8 carbon atoms, or an aralkyloxy group having 7 to 12 carbon atoms, and the other represents a hydrogen atom or an alkyl group having 1 to 8 carbon atoms.

In formula (3), $R^1$ and $R^2$ each independently represent an alkyl group having 1 to 8 carbon atoms, an aryl group having 6 to 12 carbon atoms, or an aralkyl group having 7 to 18 carbon atoms. Examples of $R^1$ and $R^2$ include alkyl groups having 1 to 8 carbon atoms, such as a methyl group, an ethyl group, a n-propyl group, an isopropyl group, a n-butyl group, an isobutyl group, a sec-butyl group, a tert-butyl group, a n-pentyl group, a tert-amyl group (—C(CH$_3$)$_2$CH$_2$CH$_3$), a 2-ethylhexyl group, and a cyclohexyl group, aryl groups having 6 to 12 carbon atoms, such as a phenyl group, and aralkyl groups having 7 to 18 carbon atoms, such as a benzyl group.

Preferred are a methyl group and alkyl groups having tertiary carbon such as a tert-butyl group and a tert-amyl group, and more preferred are a tert-amyl group, and so on.

$R^3$ represents a hydrogen atom or an alkyl group having 1 to 3 carbon atoms.

Examples of the alkyl group include a methyl group, an ethyl group, a n-propyl group, and an isopropyl group. Examples of referred $R^3$ include a hydrogen atom and a methyl group.

$R^4$ represents a hydrogen atom or a methyl group, and a hydrogen atom is preferred.

Examples of the compound represented by formula (3) include 2,4-di-tert-butyl-6-[1-(3,5-di-tert-butyl-2-hydroxyphenyl)ethyl]phenyl acrylate,
2,4-di-tert-amyl-6-[1-(3,5-di-tert-amyl-2-hydroxyphenyl)ethyl]phenyl acrylate,
2,4-di-tert-butyl-6-(3,5-di-tert-butyl-2-hydroxy-benzyl)phenyl methacrylate,
2,4-di-tert-butyl-6-[1-(3,5-di-tert-butyl-2-hydroxyphenyl)ethyl]phenyl methacrylate,
2,4-di-tert-amyl-6-[1-(3,5-di-tert-amyl-2-hydroxyphenyl)ethyl]phenyl methacrylate,
2-tert-butyl-6-(3-tert-butyl-2-hydroxy-5-methylbenzyl)-4-methylphenyl methacrylate,
2-tert-butyl-6-(3-tert-butyl-2-hydroxy-5-methylbenzyl)-4-methylphenyl acrylate,
2-tert-butyl-6-(3-tert-butyl-2-hydroxy-5-methylbenzyl)-4-ethylphenyl methacrylate,
2-tert-amyl-6-(3-tert-amyl-2-hydroxy-5-methylbenzyl)-4-meth ylphenyl methacrylate, and
2-tert-amyl-6-(3-tert-amyl-2-hydroxy-5-methylbenzyl)-4-meth ylphenyl acrylate. More preferred may be
2,4-di-tert-amyl-6-[1-(3,5-di-tert-amyl-2-hydroxyphenyl)ethyl]phenyl acrylate or
2-tert-butyl-6-(3-tert-butyl-2-hydroxy-5-methylbenzyl)-4-methylphenyl acrylate.

2,4-Di-tert-amyl-6-[1-(3,5-di-tert-amyl-2-hydroxyphenyl)ethyl]phenyl acrylate is commercially available as SUMILIZER GS(F) (registered trademark, produced by Sumitomo Chemical Co., Ltd.), and 2-tert-butyl-6-(3-tert-butyl-2-hydroxy-5-methylbenzyl)-4-methylphenyl acrylate is commercially available as SUMILIZER GM (registered trademark, produced by Sumitomo Chemical Co., Ltd.).

Examples of the alkyl group having 1 to 8 carbon atoms represented by $R^5$, $R^6$, $R^8$, and $R^9$ in formula (4) include a methyl group, an ethyl group, a n-propyl group, an isopropyl group, a n-butyl group, an isobutyl group, a sec-butyl group, a tert-butyl group, a tert-pentyl group, an isooctyl group, tert-octyl group, and a 2-ethylhexyl group.

Examples of the cycloalkyl group having 5 to 8 carbon atoms include a cyclopentyl group, a cyclohexyl group, a cycloheptyl group, and a cyclooctyl group. Examples of the alkylcycloalkyl group having 6 to 12 carbon atoms include a 1-methylcyclopentyl group, a 1-methylcyclohexyl group, and a 1-methyl-4-isopropylcyclohexyl group. Examples of the aralkyl group having 7 to 12 carbon atoms include a benzyl group, an α-methylbenzyl group, and an α,α-dimethylbenzyl group.

Preferably, $R^5$, $R^6$, and $R^8$ are each independently at each occurrence an alkyl group having 1 to 8 carbon atoms, a cycloalkyl group having 5 to 8 carbon atoms, or an alkylcycloalkyl group having 6 to 12 carbon atoms. More preferably, $R^5$ and $R^8$ are each independently at each occurrence a tertalkyl group, such as a tert-butyl group, a tert-pentyl group, and a tert-octyl group, a cyclohexyl group, or a 1-methylcyclohexyl group. Preferably, $R^6$ is at each occurrence an alkyl group having 1 to 5 carbon atoms, such as a methyl group, an ethyl group, a n-propyl group, an isopropyl group, a n-butyl group, an isobutyl group, a sec-butyl group, a tert-butyl group, and a tert-pentyl group, and it more preferably is a methyl group, a tert-butyl group, or a tert-pentyl group. $R^9$ is preferably a hydrogen atom or an alkyl group having 1 to 5 carbon atoms, such as a methyl group, an ethyl group, a n-propyl group, an isopropyl group, a n-butyl group, an isobutyl group, a sec-butyl group, a tert-butyl group, and a tert-pentyl group, and it is more preferably a methyl group or a hydrogen atom.

Examples of the alkyl group having 1 to 8 carbon atoms represented by $R^7$ include a methyl group, an ethyl group, a n-propyl group, an isopropyl group, a n-butyl group, an isobutyl group, a sec-butyl group, a tert-butyl group, a tert-pentyl group, an isooctyl group, a tert-octyl group, and a 2-ethylhexyl group, preferred is an alkyl group having 1 to 5 carbon atoms, such as a methyl group, an ethyl group, a n-propyl group, an isopropyl group, a n-butyl group, an isobutyl group, a sec-butyl group, a tert-butyl group, and a tert-pentyl group, or a hydrogen atom, and more preferred is a methyl group or a hydrogen atom.

X represents a single bond, a sulfur atom, or a divalent group represented by the formula (I-1) given above. Examples of the alkyl group having 1 to 8 carbon atoms represented by $R^{10}$ in formula (I-1) include a methyl group, an ethyl group, a n-propyl group, an isopropyl group, a n-butyl group, an isobutyl group, a sec-butyl group, a tert-butyl group, a tert-pentyl group, an isooctyl group, a tert-octyl group, and a 2-ethylhexyl group, and examples of the cycloalkyl group having 5 to 8 carbon atoms include a cyclopentyl group, a cyclohexyl group, a cycloheptyl group, and a cyclooctyl group. Preferably, $R^{10}$ is a hydrogen atom or an alkyl group having 1 to 5 carbon atoms, such as a methyl group, an ethyl group, a n-propyl group, an isopropyl group, a n-butyl group, and an isobutyl group. X is preferably a single bond or a divalent group represented by formula (I-1) and more preferably is a single bond.

Although A represents an alkylene group having 2 to 8 carbon atoms or a divalent group represented by the formula (I-2) given above, A is preferably an alkylene group having 2 to 8 carbon atoms, examples of which include an ethylene group, a propylene group, a butylene group, a pentamethylene group, a hexamethylene group, an octamethylene group, a 2,2-dimethyl-1,3-propylene group, and a propylene group is more preferred. The divalent group represented by formula (I-2) is bonded to both an oxygen atom and a benzene nucleus, and * indicates that the divalent group is bonded there to an oxygen atom. Examples of the alkylene group having 1 to 8 carbon atoms represented by $R^{11}$ include a methylene group, an ethylene group, a propylene group, a butylene group, a pentamethylene group, a hexamethylene group, an octamethylene group, and a 2,2-dimethyl-1,3-propylene group. A single bond or an ethylene group is preferred as $R^{11}$.

One out of Y and Z represents a hydroxy group, an alkyl group having 1 to 8 carbon atoms, an alkoxy group having 1 to 8 carbon atoms, or an aralkyloxy group having 7 to 12 carbon atoms, and the other represents a hydrogen atom or an alkyl group having 1 to 8 carbon atoms. Examples of the alkyl group having 1 to 8 carbon atoms include a methyl group, an ethyl group, a n-propyl group, an isopropyl group, a n-butyl group, an isobutyl group, a sec-butyl group, a tert-butyl group, a tert-pentyl group, an isooctyl group, a tert-octyl group, and a 2-ethylhexyl group. Examples of the alkoxy group having 1 to 8 carbon atoms include a methoxy group, an ethoxy group, a n-propoxy group, an isopropoxy group, a n-butoxy group, an isobutoxy group, a sec-butoxy group, a tert-butoxy group, a tert-pentyloxy group, an isooctyloxy group, a tert-octyloxy group, and a 2-ethylhexyloxy group. Examples of the aralkyloxy group having 7 to 12 carbon atoms include a benzyloxy group, an α-methylbenzyloxy group, and an α,α-dimethylbenzyloxy group.

It is preferred that in formula (4), and $R^8$ are a tert-alkyl group, cyclohexyl, or a 1-methylcyclohexyl group, $R^6$ is an alkyl group having 1 to 5 carbon atoms, $R^9$ is a hydrogen atom or an alkyl group having 1 to 5 carbon atoms, $R^7$ is a hydrogen atom or an alkyl group having 1 to 5 carbon atoms, X is a single bond, and A is an alkylene group having 2 to 8 carbon atoms. Preferably, Y is a hydroxy group and Z is a hydrogen atom.

Examples of the compound represented by formula (4) include

6-[3-(3-tert-butyl-4-hydroxy-5-methylphenyl)propoxy]-2,4,8,10-tetra-tert-butylbenzo[d,f][1,3,2]dioxaphosphepine [commercially available under the name "SUMILIZER (registered trademark) GP" from Sumitomo Chemical Co., Ltd.], 2,10-dimethyl-4,8-di-tert-butyl-6-[3-(3,5-di-tert-butyl-4-hydroxyphenyl)propoxy]-12H-dibenzo[d,g][1,3,2]dioxaphosphocin, 2,4,8,10-tetra-tert-butyl-6-[3-(3,5-di-tert-butyl-4-hydroxyphenyl)propoxy]dibenzo[d,f][1,3,2]dioxaphosphepin, 2,4,8,10-tetra-tert-pentyl-6-[3-(3,5-di-tert-butyl-4-hydroxyphenyl)propoxy]-12-methyl-12H-dibenzo[d,g][1,3,2]dioxaphosphocin, 2,10-dimethyl-4,8-di-tert-butyl-6-[3-(3,5-di-tert-butyl-4-hydroxyphenyl)propionyloxy]-12H-dibenzo[d,g][1,3,2]dioxaphosphocin, 2,4,8,10-tetra-tert-pentyl-6-[3-(3,5-di-tert-butyl-4-hydroxyphenyl)propionyloxy]-12-methyl-12H-dibenzo[d,g][1,3,2]dioxaphosphocin, 2,4,8,10-tetra-tert-butyl-6-[3-(3,5-di-tert-butyl-4-hydroxyphenyl)propionyloxy]-dibenzo[d,f][1,3,2]dioxaphosphepine, 2,10-dimethyl-4,8-di-tert-butyl-6-(3,5-di-tert-butyl-4-hydroxybenzoyloxy)-12H-dibenzo[d,g][1,3,2]dioxaphosphocin, 2,4,8,10-tetra-tert-butyl-6-(3,5-di-tert-butyl-4-hydroxybenzoyloxy)-12-methyl-12H-dibenzo[d,g][1,3,2]dioxaphosphocin, 2,10-dimethyl-4,8-di-tert-butyl-6-[3-(3-methyl-4-hydroxy-5-tert-butylphenyl)propoxy]-12H-dibenzo[d,g][1,3,2]dioxaphosphocin, 2,4,8,10-tetra-tert-butyl-6-[3-(3,5-di-tert-butyl-4-hydroxyphenyl)propoxy]-12H-dibenzo[d,g][1,3,2]dioxaphosphocin, 2,10-diethyl-4,8-di-tert-butyl-6-[3-(3,5-di-tert-butyl-4-hydroxyphenyl)propoxy]-12H-dibenzo[d,g][1,3,2]dioxaphosphocin, and 2,4,8,10-tetra-tert-butyl-6-[2,2-dimethyl-3-(3-tert-butyl-4-hydroxy-5-methylphenyl)propoxy]-dibenzo[d,f][1,3,2]dioxaphosphepin;

6-[3-(3-tert-butyl-4-hydroxy-5-methylphenyl)propoxy]-2,4,8,10-tetra-tert-butylbenzo[d,f][1,3,2]dioxaphosphepine is preferred.

The compound represented by formula (4) can be produced by, for example, the method disclosed in JP-A-10-273494.

The content of component (C) is preferably 0.001 to 2.0 parts by weight, more preferably 0.01 to 1.0 part by weight per 100 parts by weight of component (A).

By the adjustment of the content of component (C) to 0.01 to 1.0 part by weight, there can be obtained an item comprising a polypropylene resin composition with suppressed emission therefrom of volatile organic compound components.

In one preferred embodiment, the polypropylene resin composition comprising components (A), (B), and (C) further comprises component (D) that is a compound represented by the following formula (5):

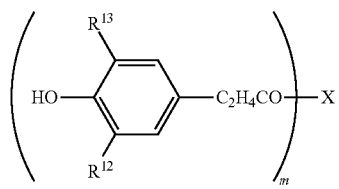

wherein $R^{12}$ and $R^{13}$ each independently at each occurrence a hydrogen atom or an alkyl group having 1 to 6 carbon atoms, X represents an m-valent alcohol residue having 1 to 24 carbon atoms that may contain a hetero atom and/or a cyclic group, and m represents an integer of 1 to 4, wherein the alcohol residue is a residual group formed by removing a hydrogen atom from a hydroxyl group of an alcohol.

In component (D), examples of the alkyl group having 1 to 6 carbon atoms include linear alkyl groups having 1 to 6 carbon atoms, such as a methyl group, an ethyl group, a n-propyl group, a n-butyl group, a n-pentyl group, and a n-hexyl group, branched alkyl group having 3 to 6 carbon atoms, such as an isopropyl group, an isobutyl group, a tert-butyl group, an isopentyl group, a tert-pentyl group, and a tert-hexyl group, and cycloalkyl groups having 3 to 6 carbon atoms, such as a cyclopentyl group and a cyclohexyl group.

Examples of a monohydric alcohol residue having 1 to 24 carbon atoms include residues of methanol, ethanol, n-propanol, isopropanol, n-butanol, tert-butanol, n-hexanol, n-octanol, n-decanol, n-dodecanol, n-tetradecanol, n-hexadecanol, and n-octadecanol.

Examples of a dihydric alcohol residue having 1 to 24 carbon atoms include residues of ethylene glycol, 1,2-propanediol, 1,3-propanediol, 1,4-butanediol, 1,5-pentanediol, 1,6-hexanediol, 1,8-octanediol, 1,10-decanediol, 1,12-dodecanediol, 1,14-tetradecanediol, 1,16-hexadecanediol, diethylene glycol, triethylene glycol, and 3,9-bis(1,1-dimethyl-2-hydroxyethyl)-2,4,8,10-tetraoxaspiro[5•5]undecane.

Examples of a trihydric alcohol residue having 1 to 24 carbon atoms include a residue of glycerol.

Examples of a tetrahydric alcohol residue having 1 to 24 carbon atoms include residues of erythritol and pentaerythritol.

More preferred as component (D) are n-octadecyl-β-(4'-hydroxy-3',5'-di-tert-butylphenyl) propionate (produced by BASF A.G., IRGANOX (registered trademark) 1076), 3,9-bis[2-{3-(3-tert-butyl-4-hydroxy-5-methylphenyl)propionyloxy}-1,1-dimethylethyl]-2,4,8,10-tetraoxaspiro[5•5]undecane (produced by Sumitomo Chemical Co., Ltd., SUMILIZER (registered trademark) GA-80).

Still more preferred as component (D) is pentaerythritol tetrakis[3-(3,5-di-tert-butyl-4-hydroxyphenyl)propionate] (produced by BASF A.G., IRGANOX (registered trademark) 1010).

The added amount of component (D) is preferably 0.001 to 2.0 parts by weight, more preferably 0.01 to 1.0 part by weight per 100 parts by weight of component (A).

By the adjustment of the content of component (D) to 0.01 to 1.0 part by weight, there can be obtained an item comprising a polypropylene resin composition with suppressed emission therefrom of volatile organic compound components.

[Component (E)]

In another preferred embodiment, the polypropylene resin composition comprising components (A), (B), and (C) further comprises the following component (E), component (E): an organophosphorus compound represented by the following formula (6), an organophosphorus compound represented by the following formula (7), an organophosphorus compound represented by the following formula (8), an organophosphorus compound represented by the following formula (9), or an organophosphorus compound represented by the following formula (10):

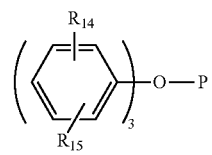

wherein $R^{14}$ and $R^{15}$ each independently at each occurrence represent a hydrogen atom, an alkyl group having from 1 to 9 carbon atoms, a cycloalkyl group having 5 to 8 carbon atoms, an alkylcycloalkyl group having 6 to 12 carbon atoms, an aralkyl group having 7 to 12 carbon atoms, or a phenyl group;

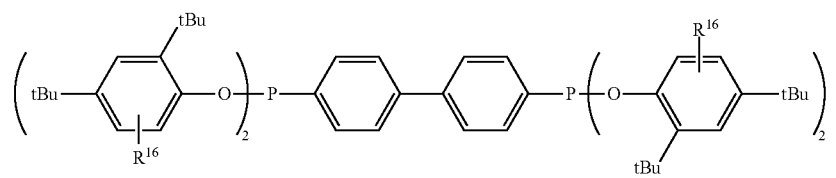

wherein $R^{16}$ represents a hydrogen atom, an alkyl group having from 1 to 9 carbon atoms, a cycloalkyl group having 5 to 8 carbon atoms, an alkylcycloalkyl group having 6 to 12 carbon atoms, an aralkyl group having 7 to 12 carbon atoms, or a phenyl group,

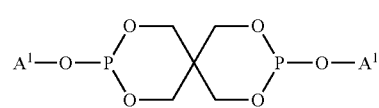

wherein A¹ represents an alkyl group having 1 to 18 carbon atoms, a phenyl group optionally substituted with an alkyl group having 1 to 9 carbon atoms, a phenyl group optionally substituted with a cycloalkyl group having 5 to 8 carbon atoms, a phenyl group optionally substituted with an alkylcycloalkyl group having 6 to 12 carbon atoms, or a phenyl group optionally substituted with an aralkyl group having 7 to 12 carbon atoms,

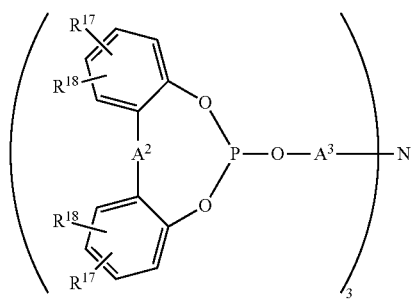

(9)

wherein $R^{17}$ and $R^{18}$ each independently at each occurrence represent a hydrogen group, an alkyl group having 1 to 9 carbon atoms, a cycloalkyl group having 5 to 8 carbon atoms, an alkylcycloalkyl group having 6 to 12 carbon atoms, an aralkyl group having 7 to 12 carbon atoms, or a phenyl group, $A^2$ represents a single bond, a sulfur atom, or an alkylidene group having 1 to 8 carbon atoms, and $A^3$ represents an alkylene group having 2 to 8 carbon atom,

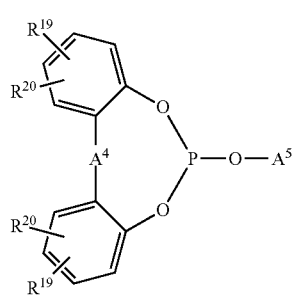

(10)

wherein $R^{19}$ and $R^{20}$ each independently at each occurrence represent a hydrogen group, an alkyl group having 1 to 9 carbon atoms, a cycloalkyl group having 5 to 8 carbon atoms, an alkylcycloalkyl group having 6 to 12 carbon atoms, an aralkyl group having 7 to 12 carbon atoms, or a phenyl group, $A^4$ represents a single bond, a sulfur atom, or an alkylidene group having 1 to 8 carbon atoms, and $A^5$ represents an alkyl group having 1 to 8 carbon atoms, a phenyl group optionally substituted with an alkyl group having 1 to 9 carbon atoms, a phenyl group optionally substituted with a cycloalkyl group having 5 to 8 carbon atoms, a phenyl group optionally substituted with an alkylcycloalkyl group having 6 to 12 carbon atoms, or a phenyl group optionally substituted with an aralkyl group having 7 to 12 carbon atoms.

[Organic Compound Represented by Formula (6)]

Examples of the alkyl group having 1 to 9 carbon atoms represented by $R^{14}$ and $R^{15}$ in the formula (6) given above include a methyl group, an ethyl group, a n-propyl group, an isopropyl group, a n-butyl group, an isobutyl group, a sec-butyl group, a tert-butyl group, a n-pentyl group, a tert-amyl group (—C(CH₃)₂CH₂CH₃), and a 2-ethylhexyl group.

Examples of the cycloalkyl group having 5 to 8 carbon atoms include a cyclopentyl group and a cyclohexyl group. Examples of the alkylcycloalkyl group having 6 to 12 carbon atoms include a 2-methylcyclopentyl group and a 2-methylcyclohexyl group. Examples of the aralkyl group having 7 to 12 carbon atoms include a benzyl group and a cumyl group (it is also called 2-phenylpropan-2-yl group).

Examples of the organic phosphorous compound represented by the formula (6) include tris(2,4-di-tert-butylphenyl) phosphite (BASF A.G., IRGAFOS (registered trademark) 168), tris(nonylphenyl)phosphite, and tris(dinonylphenyl) phosphite.

[Organic Compound Represented by Formula (7)]

Examples of the alkyl group having 1 to 9 carbon atoms represented by $R^{16}$ in the formula (7) given above include a methyl group, an ethyl group, a n-propyl group, an isopropyl group, a n-butyl group, an isobutyl group, a sec-butyl group, a tert-butyl group, a n-pentyl group, a tert-amyl group (—C(CH₃)₂CH₂CH₃), and a 2-ethylhexyl group. Examples of the cycloalkyl group having 5 to 8 carbon atoms include a cyclopentyl group and a cyclohexyl group. Examples of the alkylcycloalkyl group having 6 to 12 carbon atoms include a 2-methylcyclopentyl group and a 2-methylcyclohexyl group. Examples of the aralkyl group having 7 to 12 carbon atoms include a benzyl group and a cumyl group (it is also called 2-phenylpropan-2-yl group).

Examples of the organic phosphorous compound represented by the formula (7) give above include tetrakis(2,4-di-tert-butylphenyl)-4,4-biphenylenediphosphonite (produced by Clariant, Sandostab (registered trademark) P-EPQ) and tetrakis(2,4-di-tert-butyl-5-methylphenyl)-4,4-biphenylene diphosphonite (produced by API, YOSHINOX (registered trademark) GSY-P101). Especially, tetrakis(2,4-di-tert-butylphenyl)-4,4-biphenylenediphosphonite is preferred.

[Organic Compound Represented by Formula (8)]

In the formula (8) given above, examples of the alkyl group having 1 to 18 carbon atoms represented by $A^1$ include a methyl group, an ethyl group, a n-propyl group, an isopropyl group, a n-butyl group, an isobutyl group, a tert-butyl group, a n-hexyl group, a n-octyl group, a n-decyl group, a n-dodecyl group, a n-tetradecyl group, a n-hexadecyl group, and a n-octadecyl group.

In formula (8), examples of the phenyl group optionally substituted with an alkyl group having 1 to 9 carbon atoms include a phenyl group, a 2-methylphenyl group, a 4-methylphenyl group, a 2-tert-butylphenyl group, 4-tert-butylphenyl group, a 2-n-nonyl phenyl group, a 4-n-nonyl phenyl group, a 2,4-di-tert-butylphenyl group, a 2,4-di-n-nonyl phenyl group, a 2,6-di-tert-butylphenyl group, a 2-tert-butyl-4-methylphenyl group, a 2-tert-butyl-4-ethylphenyl group, a 2,5-di-tert-butylphenyl group, and a 2,6-di-tert-butyl-4-methylphenyl group.

In formula (8), examples of the phenyl group optionally substituted with a cycloalkyl group having 5 to 8 carbon atoms include a 2-cyclopentylphenyl group, a 2-cyclohexylphenyl group, a 4-cyclohexylphenyl group, and a 2,4-dicyclohexylphenyl group.

In formula (8), examples of the phenyl group optionally substituted with an alkylcycloalkyl group having 6 to 12 carbon atoms include a 2-(2-methylcyclohexyl)phenyl group, a 4-(2-methylcyclohexyl)phenyl group, and a 2,4-di(2-methylcyclohexyl)phenyl group.

In formula (8), examples of the phenyl group optionally substituted with an aralkyl group having 7 to 12 carbon atoms include a 2-benzylphenyl group, a 2-cumylphenyl group, a 4-cumylphenyl group, and a 2,4-dicumylphenyl group.

Examples of the organic phosphorous compound represented by the formula (8) given above include distearylpentaerythritol diphosphite (produced by ADEKA Corporation, ADK STAB (registered trademark) PEP-8), bis(2,6-di-tert-butyl-4-methylphenyl)pentaerythritol diphosphite (produced by ADEKA Corporation, ADK STAB (registered trademark) PEP-36), bis(2,4-di-tert-butylphenyl)pentaerythritol diphosphite (produced by GE Plastics, Ultranox (registered trademark) 626), and bis(2,4-dicumylphenyl)pentaerythritol diphosphite (produced by Dover Chemical Corporation, Doverphos S9228T). Especially, distearylpentaerythritol diphosphite, bis(2,6-di-tert-butyl-4-methylphenyl)pentaerythritol diphosphite, and bis(2,4-di-tert-butylphenyl)pentaerythritol diphosphite are preferred.

[Organic Compound Represented by Formula (9)]

In the formula (9) given above, examples of the alkyl group having 1 to 9 carbon atoms represented by $R^{17}$ and $R^{18}$ include a methyl group, an ethyl group, a n-propyl group, an isopropyl group, a n-butyl group, an isobutyl group, a sec-butyl group, a tert-butyl group, a n-pentyl group, a tert-amyl group ($—C(CH_3)_2CH_2CH_3$), and a 2-ethylhexyl group. Examples of the cycloalkyl group having 5 to 8 carbon atoms include a cyclopentyl group and a cyclohexyl group. Examples of the alkylcycloalkyl group having 6 to 12 carbon atoms include a 2-methylcyclopentyl group and a 2-methylcyclohexyl group. Examples of the aralkyl group having 7 to 12 carbon atoms include a benzyl group and a cumyl group (it is also called 2-phenylpropan-2-yl group).

Examples of the alkylidene group having 1 to 8 carbon atoms represented by $A^2$ in formula (9) include a methylidene group, an ethylidene group, a propan-1-ylidene group, a propan-2-ylidene group, and a n-butan-1-ylidene group.

Examples of the alkylene group having 2 to 8 carbon atoms represented by $A^3$ in formula (9) include an ethylene group, a propylene group, a trimethylene group, a tetramethylene group, a pentamethylene group, a hexamethylene group, an octamethylene group, and a 2,2-dimethyl-1,3-propylene group.

Preferred as the organic phosphorous compound represented by the formula (9) given above is 2,2',2''-nitrilotriethyl-tris(3,3',5,5'-tetra-tert-butyl-1,1'-biphenyl-2,2'-diyl) phosphite (produced by BASF A.G., IRGAFOS (registered trademark) 12).

[Organic Compound Represented by Formula (10)]

In the formula (10) given above, examples of the alkyl group having 1 to 9 carbon atoms represented by $R^{19}$ and $R^{20}$ include a methyl group, an ethyl group, a n-propyl group, an isopropyl group, a n-butyl group, an isobutyl group, a sec-butyl group, a tert-butyl group, a n-pentyl group, a tert-amyl group ($—C(CH_3)_2CH_2CH_3$), and a 2-ethylhexyl group. Examples of the cycloalkyl group having 5 to 8 carbon atoms include a cyclopentyl group and a cyclohexyl group. Examples of the alkylcycloalkyl group having 6 to 12 carbon atoms include a 2-methylcyclopentyl group and a 2-methylcyclohexyl group. Examples of the aralkyl group having 7 to 12 carbon atoms include a benzyl group.

Examples of the alkylidene group having 1 to 8 carbon atoms represented by $A^4$ in formula (10) include a methylidene group, an ethylidene group, a propan-1-ylidene group, a propan-2-ylidene group, and a n-butan-1-ylidene group.

Examples of the alkyl group having 1 to 8 carbon atoms represented by $A^5$ in formula (10) include a methyl group, an ethyl group, a n-propyl group, an isopropyl group, a n-butyl group, an isobutyl group, a tert-butyl group, a n-hexyl group, and a n-octyl group. Examples of the phenyl group optionally substituted with an alkyl group having 1 to 9 carbon atoms include a phenyl group, a 2-methylphenyl group, a 4-methylphenyl group, a 2-tert-butylphenyl group, a 4-tert-butylphenyl group, a 2-n-nonyl phenyl group, a 4-n-nonyl phenyl group, a 2,4-di-tert-butylphenyl group, a 2,4-di-n-nonyl phenyl group, a 2,6-di-tert-butylphenyl group, a 2-tert-butyl-4-methylphenyl group, a 2-tert-butyl-4-ethylphenyl group, a 2,5-di-tert-butylphenyl group, and a 2,6-di-tert-butyl-4-methylphenyl group.

Examples of the phenyl group optionally substituted with a cycloalkyl group having 5 to 8 carbon atoms represented by $A^5$ in formula (10) include a 2-cyclopentylphenyl group, a 2-cyclohexylphenyl group, a 4-cyclohexylphenyl group, and a 2,4-dicyclohexylphenyl group.

Examples of the phenyl group optionally substituted with an alkylcycloalkyl group having 6 to 12 carbon atoms represented by $A^5$ in formula (10) include a 2-(2-methylcyclohexyl)phenyl group, a 4-(2-methylcyclohexyl)phenyl group, and a 2,4-di(2-methylcyclohexyl)phenyl group.

Examples of the phenyl group optionally substituted with an aralkyl group having 7 to 12 carbon atoms represented by $A^5$ in formula (10) include a 2-benzylphenyl group, a 2-cumylphenyl group, a 4-cumylphenyl group, and a 2,4-dicumylphenyl group.

Preferred as the organophosphorus compound represented by formula (10) is 2,2-methylenebis(4,6-di-tert-butylphenyl) octyl phosphite (produced by ADEKA Corporation, ADK STAB (registered trademark) HP-10).

Organophosphorus compounds represented by formula (6) are preferred as component (E).

More preferred as the organic phosphorous compounds represented by formula (6) is tris(2,4-di-tert-butylphenyl) phosphite is more preferred.

The added amount of component (E) in the polypropylene resin composition to be used for the present invention is preferably 0.001 to 2.0 parts by weight, more preferably 0.01 to 1.0 part by weight, per 100 parts by weight of component (A).

[Component F]

In another preferred embodiment, the polypropylene resin composition comprising components (A), (B), and (C) further comprises the following component (F):

component (F): at least one filler selected from the group consisting of calcium hydroxide, alumina, zeolite, and hydrotalcite.

The average particle diameter of component (F) is preferably 0.1 μm to 150 μm, more preferably 1 μm to 10 μm. By adjusting the average particle diameter into this range, it is possible to disperse calcium hydroxide in the thermoplastic resin more uniformly. The average particle diameter can be measured by using a laser scattering particle size distribution analyzer.

The content of component (F) is preferably 0.005 parts by weight to 2 parts by weight, more preferably 0.05 parts by weight to 1 part by weight, provided that the total of the weights of component (A), component (B), and component (C) is taken as 100 parts by weight.

In still another embodiment, the polypropylene resin copolymer comprising components (A), (B), and (C) further comprises components (D) and (E), or components (E) and (F), or components (D) and (F), or components (D), (E), and (F).

[Other Additives]

The polypropylene resin composition to be used for the present invention may further comprise other additives exclusive of components (A), (B), (C), (D), (E), and (F). Examples of such additional additives include stabilizers, such as antioxidants, UV absorbers, and light stabilizers, metal deactivating agents, nucleating agents, lubricants, antistatic agents, flame retardants, fillers, and pigments.

Antioxidants include phenol-type antioxidants, hydroquinone-based antioxidants, phosphorus-containing antioxidants, and sulfur-containing antioxidants; phenol-type antioxidants and phosphorus-containing antioxidants are preferred.

Examples of phenol-type antioxidants include alkylated monophenols, such as 2,6-di-tert-butyl-4-methylphenol, 2,4,6-tri-tert-butylphenol, 2,6-di-tert-butylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, 2,6-di-nonyl-4-methylphenol, 2,4-dimethyl-6-(1'-methylundecyl-1'-yl)phenol, 2,4-dimethyl-6-(1'-methylheptadecyl-1'-yl)phenol, 2,4-dimethyl-6-(1'-methyltridecyl-1'-yl)phenol, and mixtures thereof.

Examples of phenol-type antioxidants further include alkylthiomethylphenols, such as 2,4-dioctylthiomethyl-6-tert-butylphenol, 2,4-dioctyl thiomethyl-6-methylphenol, 2,4-dioctylthiomethyl-6-ethylphenol, 2,6-didodecylthiomethyl-4-nonyl phenol, and mixtures thereof.

Examples of phenol-type antioxidants further include alkylidenebisphenols, such as 2,2'-methylenebis(4-methyl-6-tert-butylphenol), 2,2'-methylenebis(4-ethyl-6-tert-butylphenol), 2,2'-methylenebis[(4-methyl-6-(α-methylcyclohexyl)phenol]], 2,2'-methylenebis(4-methyl-6-cyclohexylphenol), 2,2'-methylenebis(4-methyl-6-nonyl phenol), 2,2'-methylenebis(4,6-di-tert-butylphenol), 2,2'-ethylidenebis(4,6-di-tert-butylphenol), 2,2'-ethylidenebis(4-isobutyl-6-tert-butylphenol), 2,2'-methylenebis[(6-(α-methylbenzyl)-4-nonylphenol)], 2,2'-methylenebis[(6-(α,α-dimethylbenzyl)-4-nonylphenol)], 4,4'-methylenebis(6-tert-butyl-2-methylphenol), 4,4'-methylenebis(2,6-di-tert-butylphenol), 4,4'-butylidenebis(3-methyl-6-tert-butylphenol), 1,1-bis(4-hydroxyphenyl)cyclohexane, 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis-3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl 4-methylphenyl]terephthalate, 1,1-bis(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane, 1,1,5,5-tetra(5-tert-butyl-4-hydroxy-2-methylphenyl)pentane, and mixtures thereof.

Examples of phenol-type antioxidants further include acylaminophenol derivatives, such as anilide 4-hydroxylauramide, 4-hydroxystearamide, octyl-N-(3,5-di-tert-butyl-4-hydroxyphenyl) carbamate, and mixtures thereof.

Examples of phenol-type antioxidants further include esters of β-(3,5-di-tert-butyl-4-hydroxyphenyl)propionic acid with alcohols, such as methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, spiroglycol, triethylene glycol, pentaerythritol, tris(hydroxyethyl) isocyanurate, N,N'-bis (hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2,2,2]octane, and mixtures thereof.

Examples of phenol-type antioxidants further include hydroxylated thiodiphenyl ethers, such as 2,2'-thiobis(6-tert-butylphenol), 2,2'-thiobis(4-methyl-6-tert-butylphenol), 2,2'-thiobis(4-octylphenol), 4,4'-thiobis(2-methyl-6-tert-butylphenol), and 4,4'-(2,6-dimethyl-4-hydroxyphenyl) disulfide.

Examples of phenol-type antioxidants further include benzyl derivatives, including O-benzyl derivatives, N-benzyl derivatives, and S-benzyl derivatives, such as 3,5,3',5'-tetra-tert-butyl-4,4'-dihydroxydibenzyl ether, octadecyl-4-hydroxy-3,5-dimethylbenzyl mercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzyl mercaptoacetate, and mixtures thereof.

Examples of phenol-type antioxidants further include triazine derivatives, such as 2,4-bis(n-octylthio)-6-(4-hydroxy-3,5-di-tert-butylanilino)-1,3,5-triazine, 2-n-octylthio-4,6-bis(4-hydroxy-3,5-di-tert-butylanilino)-1,3,5-triazine, 2-n-octylthio-4,6-bis(4-hydroxy-3,5-di-tert-butylphenoxy)-1,3,5-triazine, 2,4,6-tris(3,5-di-text-butyl-4-phenoxy)-1,3,5-triazine, tris(4-tert-butyl-3-hydroxy-2,6-dimethylbenzyl) isocyanurate, tris(3,5-di-tert-butyl-4-hydroxybenzyl) isocyanurate, 2,4,6-tris(3,5-di-tert-butyl-4-hydroxyphenylethyl)-1,3,5-triazine, 2,4,6-tris(3,5-di-tert-butyl-4-hydroxyphenylpropyl)-1,3,5-triazine, tris(3,5-dicyclohexyl-4-hydroxybenzyl)isocyanurate, tris[2-(3',5'-di-tert-butyl-4'-hydroxycinnamoyloxy)ethyl]isocyanurate, and mixtures thereof.

Examples of phenol-type antioxidants further include hydroxybenzylated malonate derivatives, such as hydroxybenzylated malonate derivatives including dioctadecyl-2,2-bis(3,5-di-tert-butyl-2-hydroxybenzyl)malonate, dioctadecyl-2-(3-tert-butyl-4-hydroxy-5-methylbenzyl)malonate, di-dodecylmercaptoethyl-2,2-bis(3,5-di-tert-butyl-4-hydroxy benzyl)malonate, bis[4-(1,1,3,3-tetramethylbutyl)phenyl]-2,2-bis(3,5-di-tert-butyl-4-hydroxybenzyl)malonate, and mixtures thereof.

Examples of phenol-type antioxidants further include aromatic hydroxybenzyl derivatives, such as 1,3,5-trimethyl-2,4,6-tris(3,5-di-tert-butyl-4-hydroxybenzyl)benzene, 1,4-bis(3,5-di-tert-butyl-4-hydroxybenzyl)-2,3,5,6-tetramethylbenzene, 2,4,6-tris(3,5-tert-butyl-4-hydroxybenzyl)phenol, and mixtures thereof.

Examples of phenol-type antioxidants further include benzyl phosphonate derivatives, such as dimethyl-3,5-di-tert-butyl-4-hydroxybenzyl phosphonate, diethyl-3,5-di-tert-butyl-4-hydroxybenzyl phosphonate, dioctadecyl-3,5-di-tert-butyl-4-hydroxybenzyl phosphonate, dioctadecyl-5-tert-butyl-4-hydroxy-3-methylbenzyl phosphonate, calcium salt of 3,5-di-tert-butyl-4-hydroxybenzylphosphonic acid monoester, and mixtures thereof.

Examples of phenol-type antioxidants further include esters of β-(5-tert-butyl-4-hydroxy-3-methylphenyl)propionic acid with alcohols, such as methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, spiroglycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, and 4-hydroxymethyl-1-phospha-2,6,7-trioxabicyclo[2,2,2]octane.

Examples of phenol-type antioxidants further include esters of β-(3,5-dicyclohexyl-4-hydroxyphenyl)propionic acid with alcohols, such as methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, spiroglycol, triethylene glycol, pentaerythritol, tris(hydroxyethyl)isocyanurate, N,N'-bis (hydroxyethyl)oxamide, 3-thiaundecanol, 3-thiapentadecanol, trimethylhexanediol, trimethylolpropane, and 4-hydroxymethyl-1-phospha-2,6,7-trioxabicyclo[2,2,2]octane.

Examples of phenol-type antioxidants further include esters of 3,5-di-tert-butyl-4-hydroxyphenylacetic acid with alcohols, such as methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, spiroglycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, and 4-hydroxymethyl-1-phospha-2,6,7-trioxabicyclo[2,2,2]octane.

Examples of phenol-type antioxidants further include amides of β-(3,5-di-tert-butyl-4-hydroxyphenyl)propionic acid, such as N,N'-bis[3-(3',5'-di-tert-butyl-4'-hydroxyphenyl)propionyl]hydrazine, N,N'-bis[3-(3',5'-di-tert-butyl-4'-hydroxyphenyl)propionyl]hexamethylenediamine, N,N'-bis [3-(3',5'-di-tert-butyl-4'-hydroxyphenyl)propionyl] trimethylenediamine, and mixtures thereof.

Examples of phenol-type antioxidants further include tocopherols, such as α-tocopherol, β-tocopherol, γ-tocopherol, δ-tocopherol, and mixtures thereof.

Examples of hydroquinone-based antioxidants include 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyphenyl stearate, bis(3,5-di-tert-butyl-4-hydroxyphenyl)adipate, and mixtures thereof.

Examples of sulfur-containing antioxidants include dilauryl 3,3'-thiodipropionate, tridecyl 3,3'-thiodipropionate, dimyristyl 3,3'-thiodipropionate, distearyl 3,3'-thiodipropionate, lauryl stearyl 3,3'-thiodipropionate, and neopentanetetrayl tetrakis(3-laurylthiopropionate).

Examples of phosphorus-containing antioxidants include triphenyl phosphite, tris(nonylphenyl)phosphite, trilauryl phosphite, trioctadecyl phosphite, distearyl pentaerythritol diphosphite, diisodecyl pentaerythritol diphosphite, bis(2,4-di-tert-butylphenyl)pentaerythritol diphosphite, bis(2,4-di-tert-butyl-6-methylphenyl)pentaerythritol diphosphite, bis (2,6-di-tert-butyl-4-methylphenyl)pentaerythritol diphosphite, bis(2,4,6-tri-tert-butylphenyl)pentaerythritol diphosphite, tristearylsorbitol triphosphite, tetrakis(2,4-di-tert-butylphenyl)-4,4'-diphenylene diphosphonite, 2,2'-methylenebis(4,6-di-tert-butylphenyl) 2-ethylhexylphosphite, 2,2'-ethylidenebis(4,6-di-tert-butylphenyl)fluorophosphite, bis(2,4-di-tert-butyl 6-methylphenyl)ethylphosphite, bis(2,4-di-tert-butyl 6-methylphenyl)methylphosphite, 2-(2,4,6-tri-tert-butylphenyl)-5-ethyl-5-butyl-1,3,2-oxaphosphorinane, 2,2',2"-nitrilo[triethyl-tris(3,3',5,5'-tetra-tert-butyl-1,1'-biphenyl-2,2'-diyl)phosphite, and mixtures thereof.

Examples of UV absorbers include salicylate derivatives such as phenyl salicylate, 4-tert-butylphenyl salicylate, 2,4-di-tert-butylphenyl 3',5'-di-tert-butyl-4'-hydroxybenzoate, 4-tert-octylphenyl salicylate, bis(4-tert-butylbenzoyl)resorcinol, benzoyl resorcinol, hexadecyl 3',5'-di-tert-butyl-4'-hydroxybenzoate, octadecyl 3',5'-di-tert-butyl-4'-hydroxybenzoate, 2-methyl-4,6-di-tertbutylphenyl 3',5'-di-tert-butyl-4'-hydroxybenzoate, and mixtures thereof.

Examples of UV absorbers further include 2-hydroxybenzophenone derivatives such as 2,4-dihydroxybenzophenone, 2-hydroxy-4-methoxybenzophenone, 2-hydroxy-4-octoxybenzophenone, 2,2'-dihydroxy-4-methoxybenzophenone, bis(5-benzoyl-4-hydroxy-2-methoxyphenyl)methane, 2,2',4,4'-tetrahydroxybenzophenone, and mixtures thereof; 2-(2-hydroxy-5-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-tert-octylphenyl)benzotriazole, 2-(3-tert-butyl-2-hydroxy-5-methylphenyl)-5-chlorobenzotriazole, 2-(3'-sec-butyl-2'-hydroxy-5'-tert-butylphenyl)benzotriazole, 2-(2'-hydroxy-4'-octyloxyphenyl)benzotriazole, 2-(3',5'-di-tert-amyl-2'-hydroxyphenyl)benzotriazole, 2-[2'-hydroxy-3',5'-bis(α,α-dimethylbenzyl)phenyl]-2H-benzotriazole, 2-[(3'-tert-butyl-2'-hydroxyphenyl)-5'-(2-octyloxycarbonylethyl)phenyl]-5-chlorobenzotriazole, 2-[3'-tert-butyl-5'-[2-(2-ethylhexyloxy)carbonylethyl]-2'-hydroxyphenyl]-5-chlorobenzotriazole, 2-[3'-tert-butyl-2'-hydroxy-5'-(2-methoxycarbonylethyl)phenyl]-5-chlorobenzotriazole, 2-[3'-tert-butyl-2'-hydroxy-5'-(2-methoxycarbonylethyl)phenyl]benzotriazole, 2-[3'-tert-butyl-2'-hydroxy-5-(2-octyloxycarbonylethyl)phenyl]benzotriazole, 2-[3'-tert-butyl-2'-hydroxy-5'-[2-(2-ethylhexyloxy)carbonylethyl]phenyl]benzotriazole, 2-[2-hydroxy-3-(3,4,5,6-tetrahydrophthalimidomethyl)-5-methylphenyl]benzotriazole, 2-(3,5-di-tert-butyl-2-hydroxyphenyl)-5-chlorobenzotriazole, 2-(3'-dodecyl-2'-hydroxy-5'-methylphenyl)benzotriazole, 2-[3'-tert-butyl-2'-hydroxy-5'-(2-isooctyloxycarbonylethyl)phenyl] benzotriazole, 2,2'-methylenebis[6-(2H-benzotriazol-2-yl)-4-(1,1,3,3-tetra methylbutyl)phenol, 2,2'-methylenebis[(4-tert-butyl-6-(2H-benzotriazol-2-yl)phenol)], condensates of poly(3-11) (ethylene glycol) with 2-[3'-tert-butyl-2'-hydroxy-5'-(2-methoxycarbonylethyl)phenyl]benzotriazole, condensates of poly(3-11)(ethylene glycol) with methyl-3-[3-(2H-benzotriazol-2-yl)-5-tert-butyl-4-hydroxyphenyl] propionate, 2-ethylhexyl 3-[3-tert-butyl-5-(5-chloro-2H-benzotriazol-2-yl)-4-hydroxyphenyl]propionate, octyl 3-[3-tert-butyl-5-(5-chloro-2H-benzotriazol-2-yl)-4-hydroxyphenyl]propionate, methyl 3-[3-tert-butyl-5-(5-chloro-2H-benzotriazol-2-yl)-4-hydroxyphenyl]propionate, 3-[3-tert-butyl-5-(5-chloro-2H-benzotriazol-2-yl)-4-hydroxyphenyl]propionic acid, 2-(2'-hydroxyphenyl)benzotriazole, and mixtures thereof.

Light stabilizers include hindered amine type light stabilizers, acrylate type light stabilizers, nickel-containing light stabilizers, oxamide type light stabilizers, and triazine type light stabilizers.

Examples of the hindered amine type light stabilizers include bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(N-octoxy-2,2,6,6-tetramethyl-4-piperidyl)sebacate, bis(N-benzyloxy-2,2,6,6-tetramethyl-4-piperidyl)sebacate, bis(N-cyclohexyloxy-2,2,6,6-tetramethyl-4-piperidyl)sebacate, bis(1,2,2,6,6-pentamethyl-4-piperidyl) 2-(3,5-di-tert-butyl-4-hydroxybenzyl)-2-butylmalonate, bis(1-acroyl-2,2,6,6-tetramethyl-4-piperidyl) 2,2-bis(3,5-di-tert-butyl-4-hydroxybenzyl)-2-butylmalonate, bis(1,2,2,6,6-pentamethyl-4-piperidyl)decanedioate, 2,2,6,6-tetramethyl-4-piperidyl methacrylate, 4-[3-(3,5-di-tert-butyl-4-hydroxyphenyl)propionyloxy]-1-[2-(3-(3,5-di-tert-butyl-4-hydroxyphenyl)propionyloxy)ethyl]-2,2,6,6-tetramethylpiperidine, 2-methyl-2-(2,2,6,6-tetramethyl-4-piperidyl)amino-N-(2,2,6,6-tetramethyl-4-piperidyl) propionamide, tetrakis(2,2,6,6-tetramethyl-4-piperidyl)1,2,3,4-butanetetracarboxylate, tetrakis(1,2,2,6,6-pentamethyl-4-piperidyl)1,2,3,4-butanetetracarboxylate, and mixed esters of 1,2,3,4-butanetetracarboxylic acid with 1,2,2,6,6-pentamethyl-4-piperidinol and 1-tridecanol.

Examples of the acrylate type light stabilizers include ethyl α-cyano-β,β-diphenyl acrylate, isooctyl α-cyano-β,β-diphenyl acrylate, methyl α-carbomethyloxycinnamate, methyl α-cyano-β-methyl-p-methoxycinnamate, butyl α-cyano-β-methyl-p-methoxycinnamate, methyl α-carbomethyloxy-p-methoxycinnamate, N-(β-carbomethyloxy-β-cyanovinyl)-2-methylindoline, and mixtures thereof.

Examples of the nickel-containing light stabilizers include nickel complexes of 2,2'-thiobis-[4-(1,1,3,3-tetramethylbutyl)phenol], nickel dibutyldithiocarbamate, nickel salts of monoalkyl esters, nickel complexes of ketoximes, and mixtures thereof.

Examples of the oxamide type light stabilizers include 4,4'-dioctyloxyoxanilide, 2,2'-diethoxyoxanilide, 2,2'-dioctyloxy-5,5'-di-tert-butylanilide, 2,2'-didodecyloxy-5,5'-di-tert-butyoanilide, 2-ethoxy-2'-ethyloxanilide, N,N'-bis(3-dimethylaminopropyl)oxamide, 2-ethoxy-5-tert-butyl-2'-ethoxyanilide, 2-ethoxy-5,4'-di-tert-butyl-2'-ethyloxanilide, and mixtures thereof.

Examples of the triazine type light stabilizers include 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-[2,4-dihydroxyphenyl-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethylphenyl)-1,3,5-triazine, 2-[2-hydroxy-4-(2-hydroxy-3-octyloxypropoxy)phenyl]-4,6-bis(2,4-dimethylphenyl)-1,3,5-triazine, and mixtures thereof.

Examples of light stabilizers further include mixed esters of 1,2,3,4-butanetetracarboxylic acid with 2,2,6,6-tetramethyl-4-piperidinol and 1-tridecanol, mixed esters of 1,2,3,4-butanetetracarboxylic acid with 1,2,2,6,6-pentamethyl-4-piperidinol and 3,9-bis(2-hydroxy-1,1-dimethylethyl)-2,4,8,10-tetraoxaspiro[5•5]undecane, mixed esters of 1,2,3,4-butanetetracarboxylic acid with 2,2,6,6-tetramethyl-4-piperidinol and 3,9-bis(2-hydroxy-1,1-dimethylethyl)-2,4,8,10-tetraoxaspiro[5•5]undecane, polycondensates of dimethyl succinate with 1-(2-hydroxyethyl)-4-hydroxy-2,2,6,6-tetramethylpiperidine, poly[(6-morpholino-1,3,5-triazine-2,4-diyl)((2,2,6,6-tetramethyl-4-piperidyl)imino)hexamethylene((2,2,6,6-tetramethyl-4-piperidyl)imino)], poly[(6-(1,1,3,3-tetramethylbutyl)imino-1,3,5-triazine-2,4-diyl((2,2,6,6-tetramethyl-4-piperidyl)imino)hexamethylene(2,2,6,6-tetramethyl-4-piperidyl)imino)], polycondensates of N,N'-bis(2,2,6,6-tetramethyl-4-piperidyl)hexamethylenediamine with 1,2-dibromoethane, N,N',4,7-tetrakis[4,6-bis(N-butyl-N-(2,2,6,6-tetramethyl-4-piperidyl)amino)-1,3,5-triazin-2-yl]-4,7-diazadecane-1,10-diamine, N,N',4-tris[4,6-bis(N-butyl-N-(2,2,6,6-tetramethyl-4-piperidyl)amino)-1,3,5-triazin-2-yl]-4,7-diazadecane-1,10-diamine, N,N',4,7-tetrakis[4,6-bis(N-butyl-N-(1,2,2,6,6-pentamethyl-4-piperidyl)amino)-1,3,5-triazin-2-yl]-4,7-diazadecane-1,10-diamine, N,N',4-tris[4,6-bis(N-butyl-N-(1,2,2,6,6-pentamethyl-4-piperidyl)amino)-1,3,5-triazin-2-yl]-4,7-diazadecane-1,10-diamine, and mixtures thereof.

Examples of other stabilizers include hydroxylamines, such as N,N-dibenzylhydroxyamine, N,N-diethylhydroxyamine, N,N-dioctylhydroxyamine, N,N-dilaurylhydroxyamine, N,N-ditetradecylhydroxyamine, N,N-dihexadecylhydroxyamine, N,N-dioctadecylhydroxyamine, N-hexadecyl-N-octadecylhydroxyamine, N-heptadecyl-N-octadecylhydroxyamine, and mixtures thereof.

Examples of the lubricants include aliphatic hydrocarbons such as paraffin and wax, higher fatty acids having 8 to 22 carbon atoms, metal (Al, Ca, Mg, Zn) salts of higher fatty acids having 8 to 22 carbon atoms, aliphatic alcohols having 8 to 22 carbon atoms, polyglycols, esters of higher fatty acids having 4 to 22 carbon atoms with aliphatic monohydric alcohols having 4 to 18 carbon atoms, higher aliphatic amides having 8 to 22 carbon atoms, silicone oil, and rosin derivatives.

[Method for Production of Polypropylene Resin Composition]

Examples of the method for producing the polypropylene resin composition to be used for the present invention include (I) a method in which component (B) and component (C), and optionally one or more compounds selected from the group consisting of component (D), component (E), and component (F), and further optionally, other additives are incorporated separately in kneading a propylene polymer (component (A)), and (II) a method comprising a step of mixing component (B), component (C), and optionally component (D), component (E), component (F), and further optionally other additives to produce a stabilizer composition, and a step of blending component (A) with the stabilizer composition. Method (II) is preferred in terms of the dispersibility in component (A) of components (B), (C), (D), (E), and (F).

The method for producing the polypropylene resin composition to be used for the present invention may be a method comprising melt-kneading its ingredients together, for example, a method using a kneading machine such as a single screw extruder, a twin screw extruder, a Banbury mixer, and a hot roll. Examples of the melt-kneading machine to be used include single screw extruders, co-rotating twin screw extruders (e.g., ZSK [registered trademark] manufactured by Coperion, TEM [registered trademark] manufactured by Toshiba Machine Co., Ltd., TEX [registered trademark] manufactured by The Japan Steel Works, Ltd., and a twin screw kneader manufactured by Technovel Corp.), counter-rotating twin screw extruders (e.g., CMP [registered trademark], TEX [registered trademark] manufactured by The Japan Steel Works, Ltd., FCM [registered trademark], NCM [registered trademark] and LCM [registered trademark] manufactured by Kobe Steel, Ltd.). It is also permissible to provide an extruder having a vent with a water inlet port, pour water while performing melt-kneading, and then perform foaming devolatilization by reducing pressure at the vent.

The step of mixing a stabilizer composition to a propylene polymer will be described in more detail; examples thereof include a method in which the propylene polymer and the stabilizer composition are dry-blended and then the blend is melt-kneaded and subsequently extruded with a single screw or twin screw extruder, so that pellets of a polypropylene resin composition are obtained, and a method in which a solution prepared by dissolving the stabilizer composition in a solvent such as cyclohexane is added to a polymer solution after the completion of the polymerization for producing the propylene polymer, and then the solvent is removed.

[Stabilizer Composition]

The stabilizer composition to be used for the present invention comprises components (B) and (C) and optionally one or more components selected from the group consisting of components (D), (E), and (F), and further optionally other additives.

Examples of the method for producing the stabilizer composition to be used for the present invention include a method in which component (B), component (C), one or more components to be optionally added which are selected from the group consisting of components (D), (E) and (F), and other additives to be further optionally added are mixed with a mixing machine such as a Henschel mixer, a Super mixer, and a high speed mixer, a method in which a mixture of component (B), component (C), one or more components to be optionally added which are selected from the group consisting of components (D), (E) and (F), and other additives to be further optionally added is further extruded, and a method in which component (B), component (C), one or more components to be optionally added which are selected from the group consisting of components (D), (E) and (F), and other additives to be further optionally added are further stirred and granulated.

[Molded Article]

Polypropylene resin molded articles made of the polypropylene resin composition of the present invention are articles which are suppressed from the emission of volatile organic compound components and are suitable as items that will be present together with persons in an enclosed space. For example, the containers are preferably food containers, such as Tupperware containers. The caps of containers are preferably caps of PET bottles. The items for packaging are preferably films for food packaging. The items for furniture are preferably items for wardrobes and storing containers. The fiber is preferably fiber for clothing, carpets, or sofas. The agricultural film is preferably film for greenhouses and agricultural tunnels. The items for automobiles are preferably items for automobile interior and items for automotive headlight. The items for household appliances are preferably parts of OA instruments such as personal computers, televisions, air-conditioners, washing machines, air cleaners, and so on. The items for medical applications are preferably medical containers, such as infusion bottles and tablet packaging materials, and items for medical instruments. The items for building applications are preferably items for the inner wall or the wallpaper of houses.

Molded articles are preferably items for wardrobes and storing containers, fiber for clothing, fiber for carpets, fiber for sofas, film for greenhouses, film for agricultural tunnels, items for automobile interior, items for automotive headlight, parts of displays, parts of OA instruments, parts of air-conditioners, parts of washing machines, items for housings, and items for the inner wall of houses or for the wallpaper of houses, and more preferably items for automobile interior, items for automotive headlight, items for the inner wall of houses or for the wallpaper of houses.

The polypropylene resin composition to be used for the present invention is fed to a molding machine and then molded. The molding method may be, for example, injection molding, extrusion forming, extrusion blow molding, injection blow molding, or biaxial stretch blow molding.

By cooling after molding, a polypropylene resin molded article of the polypropylene resin composition of the present invention is obtained.

EXAMPLES

The present invention is described below by way of Examples and Comparative Examples. The values of measurement of the amount of a volatile organic compound (S-VM measurement) in the detailed description of the invention, Examples, and Comparative Examples were measured by the method described below; "part by weight" means the amount (g) to be added per 100 g of a propylene polymer. The results of Exampled and Comparative Exampled are given in Table 1.

(1) Measurement of S-VM (Unit: Weight-ppm)

S-VM was measured by using HS-GC/FID under the following conditions. n-Pentane, n-hexane, n-heptane, acetone, 2,4-dimethyl-1-heptene, and tert-butanol were identified on the basis of their retention times and their amounts were determined in terms of n-heptane. The total amount of the components detected in 20 minutes was measured.

HS Conditions

Measuring instrument: HEADSPACE Autosampler 7000 (manufactured by Tekmar)

Heating temperature/time: 120° C./60 minutes

Sample weight: 1.0 g

GC Conditions

Measuring instrument: GC-14A (manufactured by Shimadzu Corporation)

Column: DB-WAX 0.53 mm×60 m×1.0 μm

Oven: A reaction liquid was injected at 50° C., heated up to 100° C. at a rate of 5° C./min, further heated up to 230° C. at a rate of 20° C./min, and then held for 5 minutes.

Detector: hydrogen flame ionization detector (230° C.)

Example 1

100 parts of a powdery propylene homopolymer (produced by Sumitomo Chemical Co., Ltd., HR100EG) and 0.1 parts of 6-[3-(3-tert-butyl-4-hydroxy-5-methylphenyl)propoxy]-2,4,8,10-tetra-tert-butyldibenzo[d,f][1,3,2]dioxaphosphepin (produced by Sumitomo Chemical Co., Ltd., SUMILIZER (registered trademark) GP) and 0.1 parts of trehalose (produced by Hayashibara Co., Ltd., TREHA (registered trademark)) as additives were dry blended, then the resulting composition was kneaded and extruded at 250° C., a screw rotation speed of 50 rpm, 4 kg/hr by using a single screw extruder having a screw diameter of 30 mm (manufactured by Tanabe Plastics Machinery Co., Ltd., VS30-28 extruder), and the resulting strand was cut with a pelletizer, so that pellets of about 3 mm on each side of a polypropylene resin composition were obtained. Using the pellets, S-VM was measured.

Example 2

Operations were carried out in the same manner as Example 1 except for replacing the trehalose (produced by Hayashibara Co., Ltd., TREHA (registered trademark)) of Example 1 with 0.1 parts of myo-inositol (produced by Tsuno Rice Fine Chemicals Co., Ltd., inositol).

Example 3

Operations were carried out in the same manner as Example 1 except for replacing the 6-[3-(3-tert-butyl-4-hydroxy-5-methylphenyl)propoxy]-2,4,8,10-tetra-tert-butyldibenzo[d,f][1,3,2]dioxaphosphepine (produced by Sumitomo Chemical Co., Ltd., SUMILIZER (registered trademark) GP) of Example 1 with 2,4-di-tert-amyl-6-[1-(3,5-di-tert-amyl-2-hydroxyphenyl)ethyl]phenyl acrylate (produced by Sumitomo Chemical Co., Ltd., SUMILIZER (registered trademark) GS(F)).

Example 4

Operations were carried out in the same manner as Example 3 except for changing the added amount of the trehalose (produced by Hayashibara Co., Ltd., TREHA (registered trademark)) of Example 3 from 0.1 parts to 0.01 parts.

Example 5

Operations were carried out in the same manner as Example 3 except for replacing the trehalose (produced by Hayashibara Co., Ltd., TREHA (registered trademark)) of Example 3 with myo-inositol (produced by Tsuno Rice Fine Chemicals Co., Ltd., inositol).

Comparative Example 1

Operations were carried out in the same manner as Example 1 except for failing to add the additives of Example 1.

Comparative Example 2

Operations were carried out in the same manner as Example 4 except for failing to add the 2,4-di-tert-amyl-6-[1-(3,5-di-tert-amyl-2-hydroxyphenyl)ethyl]phenyl acrylate (produced by Sumitomo Chemical Co., Ltd., SUMILIZER (registered trademark) GS(F)) of Example 4.

Comparative Example 3

Operations were carried out in the same manner as Example 5 except for failing to add the 2,4-di-tert-amyl-4-[1-(3,5-di-tert-amyl-2-hydroxyphenyl)ethyl]phenyl acrylate (produced by Sumitomo Chemical Co., Ltd., SUMILIZER (registered trademark) GS(F)) of Example 5.

Comparative Example 4

Operations were carried out in the same manner as Comparative Example 1 except for adding 0.5 parts of 6-[3-(3-tert-butyl-4-hydroxy-5-methylphenyl)propoxy]-2,4,8,10-tetra-tert-butyldibenzo[d,f][1,3,2]dioxaphosphepine (produced by Sumitomo Chemical Co., Ltd., SUMILIZER (registered trademark) GP) as an additive to Comparative Example 1.

Comparative Example 5

Operations were carried out in the same manner as Example except for failing to add the myo-inositol (produced by Tsuno Rice Fine Chemicals Co., Ltd., inositol) of Example 5.

Comparative Example 6

Operations were carried out in the same manner as Comparative Example 5 except for changing the amount of the 2,4-di-tert-amyl-6-[1-(3,5-di-tert-amyl-2-hydroxyphenyl) ethyl]phenyl acrylate (produced by Sumitomo Chemical Co., Ltd., SUMILIZER (registered trademark) GS(F)) of Comparative Example 5 from 0.1 parts to 0.5 parts.

Comparative Example 7

Operations were carried out in the same manner as Comparative Example 1 except for adding 0.05 parts of pentaerythritol tetrakis[3-(3,5-di-tert-butyl-4-hydroxyphenyl) propionate] (produced by BASF A.G., IRGANOX (registered trademark) 1010) and 0.05 parts of tris(2,4-di-tert-butylphenyl)phosphite (produced by BASF A.G., IRGAFOS (registered trademark) 168) as additives to Comparative Example 1.

Comparative Example 8

Operations were carried out in the same manner as Comparative Example 7 except for changing the amount of the pentaerythritol tetrakis[3-(3,5-di-tert-butyl-4-hydroxyphenyl)propionate] (produced by BASF A.G., IRGANOX (registered trademark) 1010) of Comparative Example 7 from 0.05 parts to 0.25 parts and the amount of the tris(2,4-di-tert-butylphenyl)phosphite (produced by BASF A.G., IRGAFOS (registered trademark) 168) from 0.05 parts to 0.25 parts.

Comparative Example 9

Operations were carried out in the same manner as Comparative Example 7 except for adding 0.1 parts of 2,4-di-tert-amyl-6-[1-(3,5-di-tert-amyl-2-hydroxyphenyl)ethyl]phenyl acrylate (produced by Sumitomo Chemical Co., Ltd., SUMILIZER (registered trademark) GS(F)) to Comparative Example 7.

Comparative Example 10

Operations were carried out in the same manner as Comparative Example 7 except for adding 0.1 parts of trehalose (produced by Hayashibara Co., Ltd., TREHA (registered trademark)) to Comparative Example Comparative Example 11

Operations were carried out in the same manner as Comparative Example 7 except for adding 0.1 parts of myo-inositol (produced by Tsuno Rice. Fine Chemicals Co., Ltd., inositol) to Comparative Example 7.

Comparative Example 12

Operations were carried out in the same manner as Comparative Example 1 except for adding 0.1 parts of 3,9-bis[2-{3-(3-tert-butyl-4-hydroxy-5-methylphenyl)propionyloxy}-1,1-dimethylethyl]-2,4,8,10-tetraoxaspiro[5•5]undecane (produced by Sumitomo Chemical Co., Ltd., SUMILIZER (registered trademark) GA-80) as an additive to Comparative Example 1.

Comparative Example 13

Operations were carried out in the same manner as Comparative Example 1 except for adding 0.1 parts of pentaerythritol tetrakis[3-(3,5-di-tert-butyl-4-hydroxyphenyl)propionate] (produced by BASF A.G., IRGANOX (registered trademark) 1010) as an additive to Comparative Example 1.

Comparative Example 14

Operations were carried out in the same manner as Comparative Example 1 except for adding 0.1 parts of tris(2,4-di-tert-butylphenyl)phosphite (produced by BASF A.G., IRGAFOS (registered trademark) 168) as an additive to Comparative Example 1.

Comparative Example 15

Operations were carried out in the same manner as Comparative Example 14 except for adding 0.1 parts of 3,9-bis[2-{3-(3-tert-butyl-4-hydroxy-5-methylphenyl)propionyloxy}-1,1-dimethylethyl]-2,4,8,10-tetraoxaspiro[5.5]undeca ne (produced by Sumitomo Chemical Co., Ltd., SUMILIZER (registered trademark) GA-80) as an additive to Comparative Example 14.

Comparative Example 16

Operations were carried out in the same manner as Comparative Example 13 except for adding 0.1 parts of tetrakis(2, 4-di-tert-butylphenyl)-4,4-biphenylenediphosphon ite (produced by Clariant, Sandostab (registered trademark) P-EPQ) as an additive to Comparative Example 13.

Example 6

100 parts of a powdery propylene homopolymer (produced by Sumitomo Chemical Co., Ltd., HR100EG) and 0.1 parts of 2-tert-butyl-6-(3-tert-butyl-2-hydroxy-5-methylbenzyl)-4-methylphenyl acrylate (produced by Sumitomo Chemical Co., Ltd., SUMILIZER (registered trademark) GM) and 0.01 parts of trehalose (produced by Tokyo Kasei Kogyo Co., Ltd., D-(+)-trehalose dihydrate) as additives were dry blended, then the resulting composition was kneaded and extruded at 250° C., a screw rotation speed of 500 rpm, 6 kg/hr by using a co-rotating twin screw extruder with a vent having a screw diameter of 15 mm (manufactured by Technovel Corp., KZW15-45MG co-rotating twin screw extruder) under vacuuming a vent port at −100 kPa-G, and the resulting strand was cut with a pelletizer, so that pellets of about 3 mm on each side of a polypropylene resin composition were obtained. Using the pellets, S-VM was measured.

Example 7

Operations were carried out in the same manner as Example 6 except for changing 0.1 parts of the 2-tert-butyl-6-(3-tert-butyl-2-hydroxy-5-methylbenzyl)-4-methylphenyl acrylate (produced by Sumitomo Chemical Co., Ltd., SUMILIZER (registered trademark) GM) of Example 6 to 0.1 parts of 2,4-di-tert-amyl-6-[1-(3,5-di-tert-amyl-2-hydroxyphenyl) ethyl]phenyl acrylate (produced by Sumitomo Chemical Co., Ltd., SUMILIZER (registered trademark) GS(F)).

Example 8

Operations were carried out in the same manner as Example 6 except for changing 0.1 parts of the 2-tert-butyl-6-(3-tert-butyl-2-hydroxy-5-methylbenzyl)-4-methylphenyl acrylate (produced by Sumitomo Chemical Co., Ltd., SUMILIZER (registered trademark) GM) of Example 6 to 0.1 parts of 6-[3-(3-tert-butyl-4-hydroxy-5-methylphenyl)propoxy]-2,4,8,10-tetra-tert-butylbenzo[d,f][1,3,2]dioxaphosphepine (produced by Sumitomo Chemical Co., Ltd., SUMILIZER (registered trademark) GP).

Example 9

Operations were carried out in the same manner as Example 7 except for adding 0.1 parts of calcium hydroxide (produced by Suzuki Kogyo Co. Ltd., Calteck LT (commercial name)) to the additives of Example 7.

Example 10

Operations were carried out in the same manner as Example 7 except for adding 0.1 parts of zeolite powder (produced by Mizusawa Industrial Chemicals, Ltd., MIZUKASIEVES EX-122 (registered trademark)) to the additives of Example 7.

Example 11

Operations were carried out in the same manner as Example 7 except for adding 0.01 parts of pentaerythritol tetrakis[3-(3,5-di-tert-butyl-4-hydroxyphenyl)propionate] (produced by BASF A.G., IRGANOX (registered trademark) 1010) to the additives of Example 7.

Example 12

Operations were carried out in the same manner as Example 11 except for adding 0.01 parts of tris(2,4-di-tert-butylphenyl)phosphite (produced by BASF A.G., IRGAFOS (registered trademark) 168) to the additives of Example 11.

Example 13

Operations were carried out in the same manner as Example 12 except for adding 0.1 parts of calcium hydroxide (produced by Suzuki Kogyo Co. Ltd., Calteck LT (commercial name)) to the additives of Example 12.

Example 14

Operations were carried out in the same manner as Example 12 except for adding 0.1 parts of zeolite powder (produced by Mizusawa Industrial Chemicals, Ltd., MIZUKASIEVES EX-122 (registered trademark)) to the additives of Example 12.

Comparative Example 17

Operations were carried out in the same manner as Example 6 except for failing to add the additives of Example 6.

Comparative Example 18

Operations were carried out in the same manner as Example 6 except for failing to add the 2-tert-butyl-6-(3-tert-butyl-2-hydroxy-5-methylbenzyl)-4-methylphenyl acrylate (produced by Sumitomo Chemical Co., Ltd., SUMILIZER (registered trademark) GM) of Example 6.

Comparative Example 19

Operations were carried out in the same manner as Comparative Example 17 except for adding 0.05 parts of pentaerythritol tetrakis[3-(3,5-di-tert-butyl-4-hydroxyphenyl) propionate] (produced by BASF A.G., IRGANOX (registered trademark) 1010) and 0.05 parts of tris(2,4-di-tert-butylphenyl)phosphite (produced by BASF A.G., IRGAFOS (registered trademark) 168) as additives to Comparative Example 17.

Comparative Example 20

Operations were carried out in the same manner as Comparative Example 19 except for adding 0.01 parts of trehalose (produced by Tokyo Kasei Kogyo Co., Ltd., D-(+)-trehalose dihydrate) as an additive to Comparative Example 19.

Example 15

A polypropylene resin composition was produced as follows using a propylene polymerized material (produced by Sumitomo Chemical Co., Ltd., AW630G) obtained by multistage polymerization, and then the measurement of S-VM was carried out.

The propylene polymerized material (produced by Sumitomo Chemical Co., Ltd., AW630G) was a propylene polymerized material obtained by multistage polymerization composed of 85% by weight of a propylene homopolymer and 15% by weight of a copolymer of propylene and ethylene; the content of structural units derived from propylene contained in the propylene homopolymer is 100% by weight, provided that the overall weight of the propylene homopolymer is taken as 100% by weight, and the content of structural units derived from ethylene contained in the copolymer of propylene and ethylene is 40% by weight, provided that the overall weight of the copolymer is taken as 100% by weight.

100 parts of a powdery propylene polymerized material (produced by Sumitomo Chemical Co., Ltd., AW630G) and 0.1 parts of 2-tert-butyl-6-(3-tert-butyl-2-hydroxy-5-methylbenzyl)-4-methylphenyl acrylate (produced by Sumitomo Chemical Co., Ltd., SUMILIZER (registered trademark) GM) and 0.01 parts of trehalose (produced by Tokyo Kasei Kogyo Co., Ltd., D-(+)-trehalose dihydrate) as additives were dry blended, then the resulting composition was kneaded and extruded at 250° C., a screw rotation speed of 600 rpm, 5 kg/hr by using a co-rotating twin screw extruder with a vent having a screw diameter of 15 mm (manufactured by Technovel Corp., KZW15-45MG co-rotating twin screw extruder) under vacuuming a vent port at −100 kPa-G, and the resulting strand was cut with a pelletizer, so that pellets of about 3 mm on each side of a polypropylene resin composition were obtained. Using the pellets, S-VM was measured.

Example 16

Operations were carried out in the same manner as Example 15 except for changing 0.1 parts of the 2-tertbutyl-6-(3-tert-butyl-2-hydroxy-5-methylbenzyl)-4-methylphenyl acrylate (produced by Sumitomo Chemical Co., Ltd., SUMILIZER (registered trademark) GM) of Example 15 to 0.1 parts of 2,4-di-tert-amyl-6-[1-(3,5-di-tert-amyl-2-hydroxyphenyl)ethyl]phenyl acrylate (produced by Sumitomo Chemical Co., Ltd., SUMILIZER (registered trademark) GS(F)).

Example 17

Operations were carried out in the same manner as Example 15 except for changing 0.1 parts of the 2-tert-butyl-6-(3-tert-butyl-2-hydroxy-5-methylbenzyl)-4-methylphenyl acrylate (produced by Sumitomo Chemical Co., Ltd., SUMILIZER (registered trademark) GM) of Example 15 to 0.1 parts of 6-[3-(3-tert-butyl-4-hydroxy-5-methylphenyl)propoxy]-2,4,8,10-tetra-tert-butylbenzo[d,f][1,3,2]dioxaphosphepine (produced by Sumitomo Chemical Co., Ltd., SUMILIZER (registered trademark) GP).

Example 18

Operations were carried out in the same manner as Example 16 except for adding 0.1 parts of calcium hydroxide (produced by Suzuki Kogyo Co. Ltd., Calteck LT (commercial name)) to the additives of Example 16.

Example 19

Operations were carried out in the same manner as Example 16 except for adding 0.1 parts of zeolite powder (produced by Mizusawa Industrial Chemicals, Ltd., MIZUKASIEVES EX-122 (registered trademark)) to the additives of Example 16.

Example 20

Operations were carried out in the same manner as Example 16 except for adding 0.01 parts of pentaerythritol tetrakis[3-(3,5-di-tert-butyl-4-hydroxyphenyl)propionate] (produced by BASF, A.G., IRGANOX (registered trademark) 1010) to the additives of Example 16.

Example 21

Operations were carried out in the same manner as Example 20 except for adding 0.01 parts of tris(2,4-di-tert-butylphenyl)phosphite (produced by BASF A.G., IRGAFOS (registered trademark) 168) to the additives of Example 20.

Example 22

Operations were carried out in the same manner as Example 21 except for adding 0.1 parts of calcium hydroxide (produced by Suzuki Kogyo Co. Ltd., Calteck LT (commercial name)) to the additives of Example 21, Example 23

Operations were carried out in the same manner as Example 21 except for adding 0.1 parts of zeolite powder (produced by Mizusawa Industrial Chemicals, Ltd., MIZUKASIEVES EX-122 (registered trademark)) to the additives of Example 21.

Comparative Example 21

Operations were carried out in the same manner as Example 15 except for failing to add the additives of Example 15.

Comparative Example 22

Operations were carried out in the same manner as Example 16 except for failing to add the 2-tert-butyl-6-(3-tert-butyl-2-hydroxy-5-methylbenzyl)-4-methylphenyl acrylate (produced by Sumitomo Chemical Co., Ltd., SUMILIZER (registered trademark) GM) of Example 16.

Comparative Example 23

Operations were carried out in the same manner as Comparative Example 21 except for adding 0.05 parts of pentaerythritol tetrakis[3-(3,5-di-tert-butyl-4-hydroxyphenyl)propionate] (produced by BASF A.G., IRGANOX (registered trademark) 1010) and 0.05 parts of tris(2,4-di-tert-butylphenyl)phosphite (produced by BASF A.G., IRGAFOS (registered trademark) 168) as additives to Comparative Example 21.

Comparative Example 24

Operations were carried out in the same manner as Comparative Example 23 except for adding 0.01 parts of trehalose (produced by Tokyo Kasei Kogyo Co., Ltd., D-(+)-trehalose dihydrate) as an additive to Comparative Example 23.

Example 24

100 parts of a powdery propylene polymerized material (produced by Sumitomo Chemical Co., Ltd., AW630G) and 0.1 parts of 2-tert-butyl-6-(3-tert-butyl-2-hydroxy-5-methylbenzyl)-4-methylphenyl acrylate (produced by Sumitomo Chemical Co., Ltd., SUMILIZER (registered trademark) GM) and 0.01 parts of trehalose (produced by Tokyo Kasei Kogyo Co., Ltd., D-(+)-trehalose dihydrate) as additives were dry blended, then the resulting composition was kneaded and extruded at 250° C., a screw rotation speed of 600 rpm, 5 kg/hr by using a co-rotating twin screw extruder with a vent having a screw diameter of 15 mm (manufactured by Technovel Corp., KZW15-45MG co-rotating twin screw extruder) under pouring water through a water inlet port with a gear pump at 100 g/hr and vacuuming a vent port at −100 kPa-G, and the resulting strand was cut with a pelletizer, so that pellets of about 3 mm on each side of a polypropylene resin composition were obtained. Using the pellets, S-VM was measured.

Example 25

Operations were carried out in the same manner as Example 24 except for changing 0.1 parts of the 2-tert-butyl-6-(3-tert-butyl-2-hydroxy-5-methylbenzyl)-4-methylphenyl acrylate (produced by Sumitomo Chemical Co., Ltd., SUMILIZER (registered trademark) GM) of Example 24 to 0.1 parts of 2,4-di-tert-amyl-6-[1-(3,5-di-tert-amyl-2-hydroxyphenyl)ethyl]phenyl acrylate (produced by Sumitomo Chemical Co., Ltd., SUMILIZER (registered trademark) GS(F)).

Example 26

Operations were carried out in the same manner as Example 24 except for changing 0.1 parts of the 2-tert-butyl-6-(3-tert-butyl-2-hydroxy-5-methylbenzyl)-4-methylphenyl acrylate (produced by Sumitomo Chemical Co., Ltd., SUMILIZER (registered trademark) GM) of Example 24 to 0.1 parts of 6-[3-(3-tert-butyl-4-hydroxy-5-methylphenyl)propoxy]-2,4,8,10-tetra-tert-butylbenzo[d,f][1,3,2]dioxaphosphepine (produced by Sumitomo Chemical Co., Ltd., SUMILIZER (registered trademark) GP).

Example 27

Operations were carried out in the same manner as Example 25 except for adding 0.1 parts of calcium hydroxide (produced by Suzuki Kogyo Co. Ltd., Calteck LT (commercial name)) to the additives of Example 25.

Example 28

Operations were carried out in the same manner as Example 25 except for adding 0.1 parts of zeolite powder (produced by Mizusawa Industrial Chemicals, Ltd., MIZUKASIEVES EX-122 (registered trademark)) to the additives of Example 25.

Example 29

Operations were carried out in the same manner as Example 25 except for adding 0.01 parts of pentaerythritol tetrakis[3-(3,5-di-tert-butyl-4-hydroxyphenyl)propionate] (produced by BASF A.G., IRGANOX (registered trademark) 1010) to the additives of Example 25.

Example 30

Operations were carried out in the same manner as Example 29 except for adding 0.01 parts of tris(2,4-di-tert-butylphenyl)phosphite (produced by BASF A.G., IRGAFOS (registered trademark) 168) to the additives of Example 29.

Example 31

Operations were carried out in the same manner as Example 30 except for adding 0.1 parts of calcium hydroxide (produced by Suzuki Kogyo Co. Ltd., Calteck LT (commercial name)) to the additives of Example 30.

Example 32

Operations were carried out in the same manner as Example 30 except for adding 0.1 parts of zeolite powder (produced by Mizusawa Industrial Chemicals, Ltd., MIZUKASIEVES EX-122 (registered trademark)) to the additives of Example 30.

Comparative Example 25

Operations were carried out in the same manner as Example 24 except for failing to add the additives of Example 24.

Comparative Example 26

Operations were carried out in the same manner as Example 24 except for failing to add the 2-tert-butyl-6-(3-tert-butyl-2-hydroxy-5-methylbenzyl)-4-methylphenyl acrylate (produced by Sumitomo Chemical Co., Ltd., SUMILIZER (registered trademark) GM) of Example 24.

Comparative Example 27

Operations were carried out in the same manner as Comparative Example 25 except for adding 0.05 parts of pentaerythritol tetrakis[3-(3,5-di-tert-butyl-4-hydroxyphenyl)propionate] (produced by BASF A.G., IRGANOX (registered trademark) 1010) and 0.05 parts of tris(2,4-di-tert-butylphenyl)phosphite (produced by BASF A.G., IRGAFOS (registered trademark) 168) as additives to Comparative Example 25.

Comparative Example 28

Operations were carried out in the same manner as Comparative Example 27 except for adding 0.01 parts of trehalose (produced by Tokyo Kasei Kogyo Co., Ltd., D-(+)-trehalose dihydrate) as an additive to Comparative Example 27.

TABLE 1

| | Additives (part by weight) | | | | | | | S-VM |
|---|---|---|---|---|---|---|---|---|
| | IRGANOX 1010 | SUMILIZER GA-80 | IRGAFOS 168 | P-EPQ | SUMILIZER GS | SUMILIZER GP | Trehalose | Inositol | (wt-ppm) |
| Example 1 | | | | | | 0.1 | 0.1 | | 61 |
| Example 2 | | | | | | 0.1 | | 0.1 | 66 |
| Example 3 | | | | | 0.1 | | 0.1 | | 66 |
| Example 4 | | | | | 0.1 | | 0.01 | | 66 |
| Example 5 | | | | | 0.1 | | | 0.1 | 68 |
| C. Example 1 | | | | | | | | | 120 |

TABLE 1-continued

| | Additives (part by weight) | | | | | | | S-VM |
|---|---|---|---|---|---|---|---|---|
| | IRGANOX 1010 | SUMILIZER GA-80 | IRGAFOS 168 | P-EPQ | SUMILIZER GS | SUMILIZER GP | Trehalose | Inositol | (wt-ppm) |
| C. Example 2 | | | | | | | 0.01 | | 110 |
| C. Example 3 | | | | | | | | 0.1 | 140 |
| C. Example 4 | | | | | | 0.5 | | | 87 |
| C. Example 5 | | | | | 0.1 | | | | 92 |
| C. Example 6 | | | | | 0.5 | | | | 87 |
| C. Example 7 | 0.05 | | 0.05 | | | | | | 92 |
| C. Example 8 | 0.25 | | 0.25 | | | | | | 88 |
| C. Example 9 | 0.05 | | 0.05 | | 0.1 | | | | 89 |
| C. Example 10 | 0.05 | | 0.05 | | | | 0.1 | | 120 |
| C. Example 11 | 0.05 | | 0.05 | | | | | 0.1 | 94 |
| C. Example 12 | | 0.1 | | | | | | | 98 |
| C. Example 13 | 0.1 | | | | | | | | 101 |
| C. Example 14 | | | 0.1 | | | | | | 88 |
| C. Example 15 | | 0.1 | 0.1 | | | | | | 82 |
| C. Example 16 | 0.1 | | | 0.1 | | | | | 80 |

"C.Example" means Comparative Example.

TABLE 2

| | Additives (part by weight) | | | | | | | | S-VM |
|---|---|---|---|---|---|---|---|---|---|
| | IRGANOX 1010 | IRGAFOS 168 | SUMILIZER GM | SUMILIZER GS | SUMILIZER GP | Trehalose | Calcium hydroxide | Zeolite | (wt-ppm) |
| Example 6 | | | 0.1 | | | 0.01 | | | 13 |
| Example 7 | | | | 0.1 | | 0.01 | | | 18 |
| Example 8 | | | | | 0.1 | 0.01 | | | 13 |
| Example 9 | | | | 0.1 | | 0.01 | 0.1 | | 21 |
| Example 10 | | | | 0.1 | | 0.01 | | 0.1 | 19 |
| Example 11 | 0.01 | | | 0.1 | | 0.01 | | | 21 |
| Example 12 | 0.01 | 0.01 | | 0.1 | | 0.01 | | | 12 |
| Example 13 | 0.01 | 0.01 | | 0.1 | | 0.01 | 0.1 | | 19 |
| Example 14 | 0.01 | 0.01 | | 0.1 | | 0.01 | | 0.1 | 16 |
| Comparative Example 17 | | | | | | | | | 114 |
| Comparative Example 18 | | | | | | 0.01 | | | 120 |
| Comparative Example 19 | 0.05 | 0.05 | | | | | | | 38 |
| Comparative Example 20 | 0.05 | 0.05 | | | | 0.01 | | | 40 |

TABLE 3

| | Additives (part by weight) | | | | | | | | S-VM |
|---|---|---|---|---|---|---|---|---|---|
| | IRGANOX 1010 | IRGAFOS 168 | SUMILIZER GM | SUMILIZER GS | SUMILIZER GP | Trehalose | Calcium hydroxide | Zeolite | (wt-ppm) |
| Example 15 | | | 0.1 | | | 0.01 | | | 13 |
| Example 16 | | | | 0.1 | | 0.01 | | | 22 |
| Example 17 | | | | | 0.1 | 0.01 | | | 32 |
| Example 18 | | | | 0.1 | | 0.01 | 0.1 | | 28 |
| Example 19 | | | | 0.1 | | 0.01 | | 0.1 | 20 |
| Example 20 | 0.01 | | | 0.1 | | 0.01 | | | 19 |
| Example 21 | 0.01 | 0.01 | | 0.1 | | 0.01 | | | 23 |
| Example 22 | 0.01 | 0.01 | | 0.1 | | 0.01 | 0.1 | | 23 |
| Example 23 | 0.01 | 0.01 | | 0.1 | | 0.01 | | 0.1 | 19 |
| Comparative Example 21 | | | | | | | | | 85 |
| Comparative Example 22 | | | | | | 0.01 | | | 86 |
| Comparative Example 23 | 0.05 | 0.05 | | | | | | | 53 |
| Comparative Example 24 | 0.05 | 0.05 | | | | 0.01 | | | 39 |

TABLE 4

| | \multicolumn{7}{c}{Additives (part by weight)} | S-VM (wt-ppm) |
|---|---|---|---|---|---|---|---|---|---|
| | IRGANOX 1010 | IRGAFOS 168 | SUMILIZER GM | SUMILIZER GS | SUMILIZER GP | Trehalose | Calcium hydroxide | Zeolite | |
| Example 24 | | | 0.1 | | | 0.01 | | | 11 |
| Example 25 | | | | 0.1 | | 0.01 | | | 11 |
| Example 26 | | | | | 0.1 | 0.01 | | | 23 |
| Example 27 | | | | 0.1 | | 0.01 | 0.1 | | 14 |
| Example 28 | | | | 0.1 | | 0.01 | | 0.1 | 13 |
| Example 29 | 0.01 | | | 0.1 | | 0.01 | | | 9 |
| Example 30 | 0.01 | 0.01 | | 0.1 | | 0.01 | | | 12 |
| Example 31 | 0.01 | 0.01 | | 0.1 | | 0.01 | 0.1 | | 13 |
| Example 32 | 0.01 | 0.01 | | 0.1 | | 0.01 | | 0.1 | 12 |
| Comparative Example 25 | | | | | | | | | 68 |
| Comparative Example 26 | | | | | | 0.01 | | | 64 |
| Comparative Example 27 | 0.05 | 0.05 | | | | | | | 38 |
| Comparative Example 28 | 0.05 | 0.05 | | | | 0.01 | | | 34 |

The invention claimed is:

1. An item made of a polypropylene resin composition comprising component (A), component (B), and component (C) each defined below:

component (A):
propylene polymerized material obtained by multistage polymerization comprising 50 to 85% by weight of a propylene polymer (I) and 15 to 50% by weight of a copolymer (II) of propylene and an olefin other than propylene, provided that the total weight of the propylene polymer (I) and the copolymer (II) is taken as 100% by weight, the content of structural units derived from propylene contained in the propylene polymer (I) constituting the propylene polymerized material is more than 75% by weight but not more than 100% by weight, provided that the overall weight of the propylene polymer (I) is taken as 100% by weight, the olefin other than propylene to be used for the copolymer (II) is at least one olefin selected from the group consisting of ethylene and α-olefins having 4 or more carbon atoms, the content of the structural units derived from the olefin other than propylene contained in the copolymer (II) is 25% by weight to 80% by weight, provided that the overall weight of the copolymer (II) is taken as 100% by weight, component (B): at least one compound selected from the following compound group S, compound group S: a group consisting of compounds represented by a formula: $C_nH_{n+2}(OH)_n$ wherein n represents an integer of 4 or more, alkoxy forms defined below, compounds represented by the following formula (2), trehalose, sucrose, lactose, maltose, melicitose, stachyose, curdlan, glycogen, glucose, and fructose;

alkoxy form: a compound having a structure in which the hydrogen atom of at least one hydroxyl group out of the hydroxyl groups contained in a compound represented by the following formula (1) has been replaced by an alkyl group having 1 to 12 carbon atoms, wherein the compound represented by formula (1) has one formyl group, keto group, or ether group and m−1 hydroxyl group(s):

$$C_mH_{2m}O_m \quad (1)$$

wherein m is an integer of 3 or more,

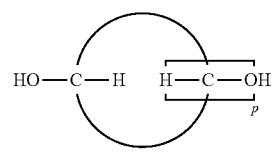

(2)

wherein p is an integer of 2 or more, component (C): a compound represented by the following formula (3) and/or a compound represented by the following formula (4):

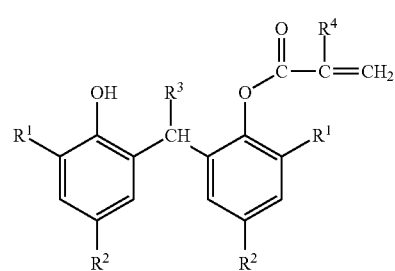

(3)

wherein $R^1$ and $R^2$ each independently at each occurrence represent an alkyl group having 1 to 8 carbon atoms, an aryl group having 6 to 12 carbon atoms, or an aralkyl group having 7 to 18 carbon atoms, $R^3$ represents a hydrogen atom or an alkyl group having 1 to 3 carbon atoms, and $R^4$ represents a hydrogen atom or a methyl group,

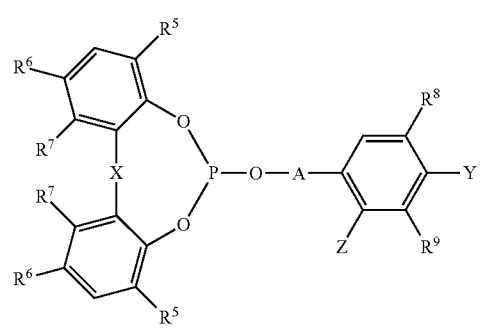

(4)

wherein $R^5$, $R^6$, $R^8$, and $R^9$ each independently at each occurrence represent a hydrogen atom, an alkyl group having from 1 to 8 carbon atoms, a cycloalkyl group having 5 to 8 carbon atoms, an alkylcycloalkyl group having 6 to 12 carbon atoms, an aralkyl group having 7 to 12 carbon atoms, or a phenyl group, $R^7$ each independently represents a hydrogen atom or an alkyl group having 1 to 8 carbon atoms, X represents a sulfur atom or a divalent group represented by the following formula (I-1):

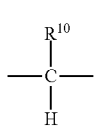
(I-1)

wherein $R^{10}$ represents a hydrogen atom, an alkyl group having 1 to 8 carbon atoms, or a cycloalkyl group having 5 to 8 carbon atoms, A is an alkylene group having 2 to 8 carbon atoms or a divalent group represented by the following formula (I-2):

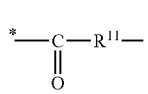
(I-2)

wherein $R^{11}$ represents a single bond or an alkylene group having 1 to 8 carbon atoms, and * represents a site which bonds to an oxygen atom; one out of Y and Z represents a hydroxy group, an alkyl group having 1 to 8 carbon atoms, an alkoxy group having 1 to 8 carbon atoms, or an aralkyloxy group having 7 to 12 carbon atoms, and the other represents a hydrogen atom or an alkyl group having 1 to 8 carbon atoms.

2. The item according to claim 1, wherein component (B) is myo-inositol, scyllo-inositol, or trehalose.

3. The item according to claim 1, wherein the compound represented by formula (3) is 2,4-di-tert-amyl-6-[1-(3,5-di-tert-amyl-2-hydroxyphenyl)ethyl]phenyl acrylate or 2-tert-butyl-6-(3-tert-butyl-2-hydroxy-5-methylbenzyl)-4-methylphenyl acrylate.

4. The item according to claim 1, wherein the compound represented by formula (4) is 6-[3-(3-tert-butyl-4-hydroxy-5-methylphenyl)propoxy]-2,4,8,10-tetra-tert-butylbenzo[d,f][1,3,2]dioxaphosphepine.

5. The item according to claim 1, wherein the polypropylene resin composition further comprises the following component (D):

component (D): a compound represented by the following formula (5):

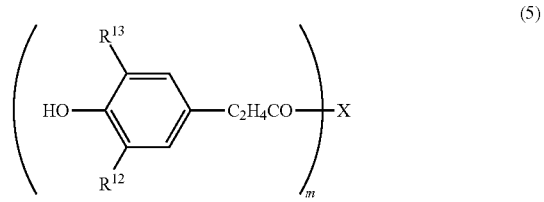
(5)

wherein $R^{12}$ and $R^{13}$ each independently at each occurrence represent a hydrogen atom or an alkyl group having 1 to 6 carbon atoms, X represents an m-valent alcohol residue having 1 to 24 carbon atoms that may contain a hetero atom and/or a cyclic group, and m represents an integer of 1 to 4, wherein the alcohol residue is a residual group formed by removing a hydrogen atom from a hydroxyl group of an alcohol.

6. The item according to claim 5 made of the polypropylene resin composition in which the compound represented by a formula (5) is pentaerythritol tetrakis[3-(3,5-di-tert-butyl-4-hydroxyphenyl) propionate].

7. The item according to claim 1, wherein the polypropylene resin composition further comprises the following component (E):

component (E): an organophosphorus compound represented by the following formula (6), an organophosphorus compound represented by the following formula (7), an organophosphorus compound represented by the following formula (8), an organophosphorus compound represented by the following formula (9), or an organophosphorus compound represented by the following formula (10),

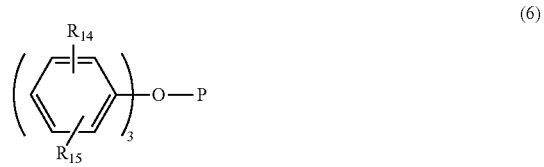
(6)

wherein $R^{14}$ and $R^{15}$ each independently at each occurrence represent a hydrogen atom, an alkyl group having from 1 to 9 carbon atoms, a cycloalkyl group having 5 to 8 carbon atoms, an alkylcycloalkyl group having 6 to 12 carbon atoms, an aralkyl group having 7 to 12 carbon atoms, or a phenyl group;

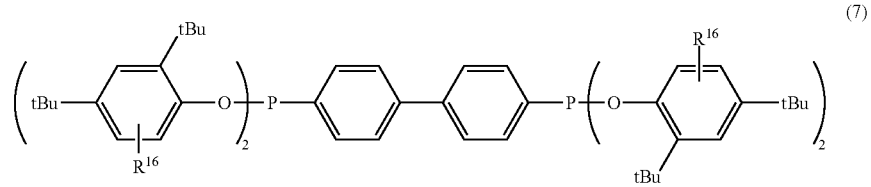
(7)

wherein $R^{16}$ represents a hydrogen atom, an alkyl group having from 1 to 9 carbon atoms, a cycloalkyl group having 5 to 8 carbon atoms, an alkylcycloalkyl group having 6 to 12 carbon atoms, an aralkyl group having 7 to 12 carbon atoms, or a phenyl group,

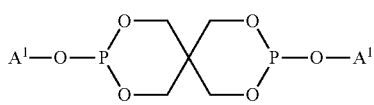

(8)

wherein $A^1$ represents an alkyl group having 1 to 18 carbon atoms, a phenyl group optionally substituted with an alkyl group having 1 to 9 carbon atoms, a phenyl group optionally substituted with a cycloalkyl group having 5 to 8 carbon atoms, a phenyl group optionally substituted with an alkylcycloalkyl group having 6 to 12 carbon atoms, or a phenyl group optionally substituted with an aralkyl group having 7 to 12 carbon atoms,

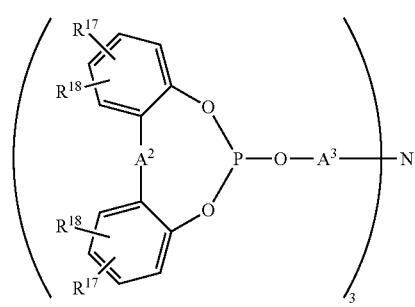

(9)

wherein $R^{17}$ and $R^{18}$ each independently at each occurrence represent a hydrogen group, an alkyl group having 1 to 9 carbon atoms, a cycloalkyl group having 5 to 8 carbon atoms, an alkylcycloalkyl group having 6 to 12 carbon atoms, an aralkyl group having 7 to 12 carbon atoms, or a phenyl group, $A^2$ represents a single bond, a sulfur atom, or an alkylidene group having 1 to 8 carbon atoms, and $A^3$ represents an alkylene group having 2 to 8 carbon atom,

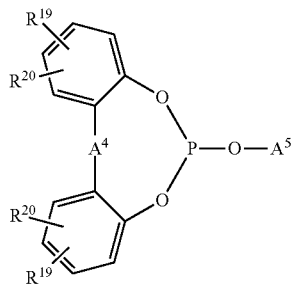

(10)

wherein $R^{19}$ and $R^{20}$ each independently at each occurrence represent a hydrogen group, an alkyl group having 1 to 9 carbon atoms, a cycloalkyl group having 5 to 8 carbon atoms, an alkylcycloalkyl group having 6 to 12 carbon atoms, an aralkyl group having 7 to 12 carbon atoms, or a phenyl group, $A^4$ represents a single bond, a sulfur atom, or an alkylidene group having 1 to 8 carbon atoms, and $A^5$ represents an alkyl group having 1 to 8 carbon atoms, a phenyl group optionally substituted with an alkyl group having 1 to 9 carbon atoms, a phenyl group optionally substituted with a cycloalkyl group having 5 to 8 carbon atoms, a phenyl group optionally substituted with an alkylcycloalkyl group having 6 to 12 carbon atoms, or a phenyl group optionally substituted with an aralkyl group having 7 to 12 carbon atoms.

8. The item according to claim 7, wherein component (E) is an organophosphorus compound represented by formula (6).

9. The item according to claim 7, wherein component (E) is tris(2,4-di-tert-butylphenyl)phosphite.

10. The item according to claim 1, wherein the polypropylene resin composition further comprises the following component (F):
component (F): at least one filler selected from the group consisting of calcium hydroxide, alumina, zeolite, and hydrotalcite.

11. The item according to claim 1, that is a container, a cap of a container, an item for packaging, stationery, a toy, a miscellaneous daily item, an item for furniture, fiber, an agricultural film, an item for automobiles, an item for household electric appliances, an item for medical applications, or an item for building applications.

* * * * *